US012523668B2

(12) United States Patent
Davis et al.

(10) Patent No.: US 12,523,668 B2
(45) Date of Patent: Jan. 13, 2026

(54) SYSTEMS AND METHODS FOR LABORATORY DECK SETUP VERIFICATION

(71) Applicant: Beckman Coulter, Inc., Brea, CA (US)

(72) Inventors: Matthew S. Davis, Indianapolis, IN (US); Yilin Liu-Leitke, Indianapolis, IN (US); Rachel Ellen Moschell, Carmel, IN (US); Peter Robert Nei, Brownsburg, IN (US); John S. Snider, Brownsburg, IN (US); Robert J. Zigon, Carmel, IN (US)

(73) Assignee: Beckman Coulter, Inc., Brea, CA (US)

( * ) Notice: Subject to any disclaimer, the term of this patent is extended or adjusted under 35 U.S.C. 154(b) by 822 days.

(21) Appl. No.: 17/637,442

(22) PCT Filed: Aug. 21, 2020

(86) PCT No.: PCT/US2020/047409
§ 371 (c)(1),
(2) Date: Feb. 22, 2022

(87) PCT Pub. No.: WO2021/041216
PCT Pub. Date: Mar. 4, 2021

(65) Prior Publication Data
US 2022/0276274 A1 Sep. 1, 2022

Related U.S. Application Data

(60) Provisional application No. 62/890,790, filed on Aug. 23, 2019.

(51) Int. Cl.
*G01N 35/00* (2006.01)
*B01L 1/00* (2006.01)

(52) U.S. Cl.
CPC .......... *G01N 35/00722* (2013.01); *B01L 1/00* (2013.01); *G01N 2035/00891* (2013.01)

(58) Field of Classification Search
CPC ... G01N 35/00722; G01N 2035/00891; G01N 35/0092; G01N 35/00732; B01L 1/00
See application file for complete search history.

(56) References Cited

U.S. PATENT DOCUMENTS 9,446,418 B2 * 9/2016 Johns ................. G01N 35/0099
2003/0129755 A1 * 7/2003 Sadler ................... B01L 3/5085
506/13

(Continued)

FOREIGN PATENT DOCUMENTS

CN 103592447 B 12/2016
CN 107431788 A 12/2017

(Continued)

OTHER PUBLICATIONS

Anonymous: "Image analysis—Wikipedia," retrieved from the Internet: http://www.en.wikipedia.org/wiki/Image_analysis (Jun. 24, 2019).

(Continued)

*Primary Examiner* — Jennifer Wecker
*Assistant Examiner* — Britney N. Washington
(74) *Attorney, Agent, or Firm* — Merchant & Gould P.C.

(57) ABSTRACT

A laboratory workstation for preparing a sample according to a programmed protocol. The laboratory workstation may include a display device configured to display an instruction for loading a first item of labware onto a deck of the laboratory workstation at a position on the deck specified by the programmed protocol; an imaging device configured to monitor the deck of the laboratory workstation by creating one or more images of the deck; and a processor configured to recognize, in the one or more images created by the imaging device, an item of labware loaded onto the deck by (Continued)

an operator. In some embodiments, the processor may be configured to indicate on the display device whether the recognized item of labware loaded by the operator is arranged on the deck in accordance with the programmed protocol.

20 Claims, 12 Drawing Sheets

(56) References Cited

U.S. PATENT DOCUMENTS

| | | |
|---|---|---|
| 2013/0079599 A1 | 3/2013 | Holmes et al. |
| 2013/0132006 A1* | 5/2013 | Gwynn .................. B01L 3/021 |
| | | 702/55 |
| 2013/0333490 A1* | 12/2013 | Tanoue ..................... G06T 7/74 |
| | | 348/135 |
| 2016/0205360 A1 | 7/2016 | Allen |
| 2017/0230561 A1 | 8/2017 | Mueller et al. |
| 2018/0045747 A1 | 2/2018 | Chang et al. |
| 2022/0050028 A1* | 2/2022 | Mohiuddin .......... C12Q 1/6806 |

FOREIGN PATENT DOCUMENTS

| | | |
|---|---|---|
| EP | 2693218 B1 | 8/2016 |
| JP | 2018507407 A | 3/2018 |
| WO | 2016090113 A2 | 6/2016 |
| WO | 2016133919 A1 | 8/2016 |
| WO | 2019152604 A1 | 8/2019 |

OTHER PUBLICATIONS

Anonymous: "Template matching—Wikipedia," retrieved from the Internet: https://www.en.wikipedia.org/w/index.php?title=Template-matching&oldid=866520552 (Oct. 30, 2018).

International Search Report and Written Opinion, PCT/US2020/047409, Beckman Coulter, Inc., 11 pages (Nov. 4, 2020).

Labplan: "DeckOptix Final Check," retrieved from the Internet: https://www.youtube.com/watch?v=jZ7wiF2LgZc (May 2, 2019).

European Patent Office; Communication—Extended European Search Report for Application No. 24178106.1 mailed Jul. 3, 2024; 14 pages.

\* cited by examiner

SYSTEMS AND METHODS FOR LABORATORY DECK SETUP VERIFICATION

CROSS-REFERENCE TO RELATED APPLICATIONS

This application is a U.S. national stage application of PCT Application No. PCT/US2020/047409, filed Aug. 21, 2020, which claims the benefit of priority to U.S. Provisional Patent Application No. 62/890,790, filed Aug. 23, 2019, which is incorporated herein by reference in its entirety.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Many laboratory methods or processes can be automated or partially automated using a laboratory workstation. Such methods or processes are performed (or partially performed) by the laboratory workstation according to a programmed protocol directing the operation of the laboratory workstation. Proper performance of a particular programmed protocol, such as the construction of a library of nucleic acid fragments for NGS sequencing, by the laboratory workstation, may require that samples, reagents, vials, pipette tips, and/or other items of labware or equipment be arranged on a deck or other surface of the laboratory workstation in a particular configuration defined by the programmed protocol. For example, automated or partially automated systems, such as liquid handler systems, may have a deck for receiving samples, reagents, labware, and equipment arranged thereon. In order to perform a particular programmed protocol, such systems may depend upon a correct configuration of labware, samples, laboratory equipment, and/or other components on the deck. This process of loading labware, samples, laboratory equipment, and/or other components onto proper positions of a deck is commonly referred to as deck setup.

Deck setup is often performed manually by a laboratory technician or other operator. The deck setup may include several steps, including placement of particular quantities of particular components in defined positions and with defined orientations on the deck. Manual deck setup may be prone to human error. If the operator mistakenly misidentifies a component, places a piece of labware in an incorrect position, fails to remove or place a component lid as required, miscounts or incorrectly measures a quantity, or makes any other of a number of errors, the automated or partially automated method or process may not be completed successfully. Errors in deck setup may also be compounded, such that if the user is unaware of a first error, it may lead to a number of additional errors. Moreover, in some cases, errors in deck setup may lead to waste of samples or other materials where samples are discarded after an improper run. In some cases, errors may lead to damaged equipment where, for example, an incorrect deck setup leads to a physical equipment crash during performance of the programmed protocol.

Thus, there is a need in the art for improved systems and methods for deck setup verification. In particular, there is a need in the art for systems and methods to mitigate human errors introduced during manual deck setup.

SUMMARY

The following presents a simplified summary of one or more embodiments of the present disclosure in order to provide a basic understanding of such embodiments. This summary is not an extensive overview of all contemplated embodiments and is intended to neither identify key or critical elements of all embodiments, nor delineate the scope of any or all embodiments.

The present disclosure, in one or more embodiments, relates to a laboratory workstation for preparing a sample according to a programmed protocol. The laboratory workstation may include a display device configured to display an instruction for loading a first item of labware onto a deck of the laboratory workstation at a position on the deck specified by the programmed protocol. The workstation may additionally include an imaging device configured to monitor the deck of the laboratory workstation by creating one or more images of the deck. The workstation may further include a processor configured to recognize, in the one or more images created by the imaging device, an item of labware loaded onto the deck by an operator. In some embodiments, the processor may be configured to indicate on the display device whether the recognized item of labware loaded by the operator is arranged on the deck in accordance with the programmed protocol. In some embodiments, the processor may be configured to indicate on the display device whether the recognized item of labware is the first item. The instruction may include a checklist in some embodiments, and the processor may be configured to indicate on the display whether the item of labware loaded onto the deck by the operator is an item on the checklist. The instruction may include a deck map in some embodiments. Moreover, the deck and imaging device may be arranged in a housing, and the display device may be arranged on an inner wall of the housing. Recognizing an item of labware loaded onto the deck by an operator may include identifying the item using an artificial neural network, image comparison, and/or template matching. In some embodiments, the programmed protocol may call for a plurality of items of labware to be arranged on the deck, and the processor may be configured to recognize each of the plurality of items of labware as it is placed on the deck, regardless of order of placement. The labware item may include a sample vessel, reagent vessel, reaction vessel, pipette tip, pipette tip holder, lid, liquid waste container, liquid level, carousel, or seal. The display device may be configured to display instructions for loading a plurality of items onto the deck, and the processor may be configured to indicate on the display device whether the recognized item of labware is one of the plurality of items of labware. The recognized item of labware may include a plurality of components, and recognizing the item of labware may include counting the plurality of components. In such embodiments, the plurality of components may include a stack of components. In other embodiments, the plurality of components may include pipette tips arranged in a tip box. The imaging device may be configured to create one or more images or videos of the deck each time the operator places an item of labware on the deck, continuously, at intervals, intermittently, or on demand. In some embodiments, the laboratory workstation may include a fluid handling system. In some embodiments, the laboratory workstation may include a reflective surface configured to reflect a view toward the imaging device. The reflective surface may be arranged to reflect a view of a thermal cycler toward the imaging device. In some embodiments, the display device may further be configured to display an instruction for unloading the first item of labware from the deck in accordance with the programmed protocol. Moreover, the processor may be configured to recognize, in the one or more images created by the imaging device, removal of the first item of labware from the deck by an operator and indicate on the display device whether the first item was removed from the deck in accordance with the programmed protocol. The processor may further be configured to recognize removal of each of a plurality of items of labware as it is removed from the deck, regardless of order of removal. In some embodiments, the processor may be configured to perform the recognizing and indicating steps within between approximately 0.1 seconds and approximately 0.8 seconds.

The present disclosure, in one or more embodiments, additionally relates to a fluid handling system for preparing a sample according to a programmed protocol. The fluid handling system may include an imaging device configured to monitor a deck of the fluid handling system by creating one or more images of the deck. The fluid handling system may further include a processor configured to recognize, in the one or more images of the deck, when an operator has loaded an item of labware onto the deck. Moreover, the processor may be further configured to determine whether the loaded item of labware has been loaded on the deck in accordance with the programmed protocol. Determining whether the loaded item of labware has been loaded in accordance with the programmed protocol may include analyzing the one or more images of the deck using an artificial neural network, image comparison, and/or template matching. Template matching may include counting a number of templates identifiable in the one or more images of the deck. In some embodiments, the loaded item of labware may include a pipette tip box and the template may include a pipette tip and/or an opening for receiving a pipette tip. Determining whether the loaded item of labware has been loaded in accordance with the programmed protocol may include identifying the loaded item of labware, identifying a location on the deck of the loaded item of and determining whether the loaded item of labware is an item of labware designated by the programmed protocol for the location. Determining if the loaded item of labware has been loaded on the deck in accordance with the programmed protocol may include color detection in some embodiments. Additionally, the processor may be configured to provide feedback to the operator indicating whether the item of labware has been loaded at a proper location on the deck according to the programmed protocol.

The present disclosure, in one or more embodiments, additionally relates to a method of verifying arrangement of labware on a deck of a laboratory workstation in accordance with a programmed protocol. The method may include displaying, on a display device, an instruction for loading labware onto the deck. The method may additionally include monitoring the deck by creating one or more images of the deck using an imaging device. The method may further include, from the one or more images of the deck, identifying an item of labware loaded onto the deck by an operator. The method may include, from the one or more images of the deck, determining whether the item of labware is arranged on the deck in accordance with the programmed protocol, and providing feedback to the operator regarding arrangement of the item of labware. In some embodiments, identifying an item of labware loaded onto the deck may include analyzing the one or more images using an artificial neural network, image comparison, and/or template matching. In some embodiments, the item of labware loaded onto the deck may be a first item, and the method may include, from the one or more images of the deck, identifying a second item of labware loaded onto the deck by the operator and determining whether the second item of labware is arranged on the deck in accordance with the programmed protocol. The method may include providing feedback to the operator regarding arrangement of the second item of labware. In some embodiments, providing feedback may include displaying on the display device an indication of whether the item of labware is arranged on the deck in accordance with the programmed protocol.

The present disclosure, in one or more embodiments, additionally relates to a method of verifying removal of labware from a deck of a laboratory workstation in accordance with a programmed protocol. The method may include displaying on a display device an instruction for unloading an item of labware from the deck. The method may further include monitoring the deck by creating one or more images of the deck using an imaging device and, from the one or more images, determining whether the item of labware has been removed from the deck by an operator. The method may further include providing feedback indicating whether the item of labware has been removed from the deck by the operator. In some embodiments, determining whether the item of labware has been removed from the deck may include determining whether an area of the deck associated with the item of labware is empty. Determining whether the item of labware has been removed may include analyzing the one or more images of the deck using an artificial neural network, image comparison, and/or template matching.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to systems and methods for facilitating deck setup for a laboratory ("lab") workstation or fluid handling system. In particular, the present disclosure relates to system and methods for reducing errors introduced during manual setup of samples, reagents, vials, and/or other labware on a deck of a lab workstation or fluid handling system. Systems and methods of the present disclosure may be configured for providing a lab technician or other operator with easily accessible and navigable instructions for deck setup. Instructions may be based on a particular lab analysis, process, or protocol(s) to be performed using a workstation or handling system, and may be displayed at or near the operator's eye level while the operator is positioned at the workstation or handling system to load equipment onto the deck. In this way, the operator may quickly and easily reference the displayed instructions without turning away from the deck. Additionally, systems and methods of the present disclosure may be configured for verifying accuracy of a deck setup in accordance with a protocol and providing feedback to the operator regarding errors in the deck setup. Deck verification may be performed by generating one or more images of the deck with component(s) arranged thereon and employing machine learning to identify components arranged on the deck and compare identified components to deck setup requirements for a particular lab analysis or process to be performed. In some embodiments, deck verification may be performed in real time or near real time while an operator arranges components on the deck.

Figure 1:
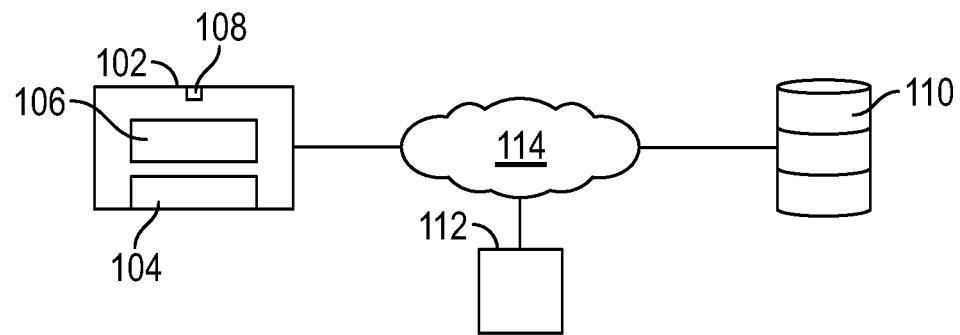
FIG. 1 is a diagram of a fluid handling system of the present disclosure, according to one or more embodiments.

Turning now to FIG. 1, a diagram of a system 100 of the present disclosure is shown. The system 100 may be or include a workstation or handling system for laboratory samples. In some embodiments, the system 100 may be a system for performing automated or partially automated processes on biological samples. In at least one embodiment, the system 100 may be or include a liquid handling system configured for processing liquid samples, such as DNA or RNA samples. In particular embodiments, the system 100 may be configured for analyses related to cancer panels, DNA sequencing, RNA sequencing, HLA typing, or target/exome capture. In at least one embodiment, the system 100 may be configured for library creation of DNA fragments for sequencing, including fragmentation or target selection, adapter attachment, size selection, nucleic acid amplification, and/or final library quantification steps. In other embodiments, the system 100 may be configured for other analyses or processes performed with respect to liquid samples, tissue samples, and/or other sample types.

As shown in FIG. 1, the system 100 may include a deck housing 102 with a deck 104, display device 106, and imaging device 108. The system 100 may additionally have a database 110 and a data processor 112. Components of the system 100 may be communicably coupled via an electronic communication network 114. The network 114 may include one or more wired or wireless networks allowing for electronic communication between the various components of the system 100. In some embodiments, the network 114 may include a local area network (LAN), a wide area network (WAN), hotspot, a global communications network, such as the Internet, and/or other suitable network environments.

The deck 104 may include a platform or surface configured for receiving samples, reagents, vials, and/or other labware. In some embodiments, the deck 104 may include a plurality of platforms. Each platform may have one or more recesses shaped and sized to receive a sample, reagent, vias, and/or other labware. In some embodiments, the deck 104 may have a grid pattern arranged thereon. The deck housing 102 may provide an enclosure for the deck 104. In some embodiments, the deck housing 102 may also house a controllable pipettor, gripper, one or more robotic arms, and/or other controllable processing equipment configured for processing samples arranged on the deck 104. In some embodiments, such pipettor, gripper, robotic arm, or other processing equipment may be automated or partially automated to perform designated methods, analyses, or processes. The housing 102 may be configured to be fully or partially enclosed and may provide an opening, such as a door or window, through which a technician or other operator may access the deck 104.

The display device 106 may be arranged on or within the deck housing 102 and may be configured to provide information to a technician or other operator while arranging samples or other components on the deck 104. In particular, the display device 106 may be configured for displaying deck setup instructions to an operator to guide the operator in arranging samples, reagents, vials, and/or other labware on the deck 104 for a particular analysis or process to be performed within the housing 102. The display device 106 may be or include a monitor or screen, such as for example an LCD, LED, or other suitable digital display. In some embodiments, the display device 106 may provide a graphical user interface (GUI) with which the operator may interact. The display device 106 may have any suitable size and shape configured to provide visible instructions to an operator loading samples, reagents, vials, and/or other labware onto the deck 104.

In some embodiments, the display device 106 may be arranged and configured to be within an operator's line of sight, or otherwise easily viewable, as the operator arranges samples, reagents, vials, and/or other labware on the deck 104. For example, the display device 106 may be arranged on, in, or adjacent an inner wall of the housing 102, such as a rear wall opposite a door or window through which the operator accesses the housing. In other embodiments, the display device 106 may be arranged on another suitable surface within the housing 102. In other embodiments, the display device 106 may be arranged on, in, or adjacent an outer surface of the housing 102. In still other embodiments, the display device 106 may be arranged at another suitable location, and in some embodiments, may be independent or remote from the housing 102. It is to be appreciated that other types of displays are contemplated as well. For example, the display device 106 may be or include a projection screen in some embodiments. Instructions and/or other data or images may be projected onto an interior wall of the housing 102 or another suitable surface. In other embodiments, the display device 106 may be or include a print-out or other suitable display type.

The imaging device 108 may be arranged on or within the deck housing 102 and may be configured to capture images of the deck 104 and/or components arranged on the deck. In some embodiments, the imaging device 108 may be arranged on, in, or adjacent an interior wall of the housing 102, such as an upper wall above the deck 104, a back wall opposite a door or window, or any other suitable inner wall. The imaging device 108 may be configured and arranged to capture an overhead or plan view of the deck 104, or a portion thereof. In some embodiments, the imaging device 108 may be or include a camera. The camera may be configured to capture still images and/or video of the deck 104. Additionally or alternatively, the imaging device 108 may include a sensor or reader, such as a barcode reader, quick response (QR) code reader, or other suitable device data imaging, reading, or sensing device. Additionally or alternatively, the camera may be configured or calibrated to create templates on a per-instrument basis. Template creation on a per-instrument basis can be useful to minimize or eliminate instrument-to-instrument variation, since each instrument might have different lighting configurations that can affect, among other things, template matching and/or the labware item locations may be slightly different within a template image.

In some embodiments, the system 100 may have a mirror or other reflective surface configured to expand a field of view of the imaging device 108. In particular, a reflective surface may be arranged on the deck 104 or an inner surface of the housing 102, for example. The reflective surface may be positioned and arranged so as to reflect an image of a portion of the deck 104 toward the imaging device 108, the reflected portion of the deck being one that the imaging device may not otherwise capture in imaging. This may allow the imaging device 108 to capture image(s), via the reflective surface, with an expanded field of view such that a component arranged on the deck in the expanded field of view may be verified. As an example, a mirror or other reflective surface may be arranged on the deck 104, or on another surface, and may face generally upward to project a view of the underside of components, such as a thermal cycler. The mirror or other reflective surface may be used, for example, to determine whether a seal, seal plate, and/or seal pad are arranged on an underside of a lid of the thermal cycler. Mirrors or other reflective surfaces may be used to display a side of a component to project a component label, for example, into a field of view of the imaging device 108. In some embodiments, a mirror or reflective surface may be configured to magnify a field of view.

In some embodiments, the display device 106 and/or the imaging device 108 may have a covering or shielding to provide protection from physical damage, liquids, UV-C or other light rays, and/or other protection. A shielding may be constructed of transparent or partially transparent plastic, glass, or other suitable material. In at least one embodiment, a shielding may be constructed of a polycarbonate material, for example.

Figure 2:
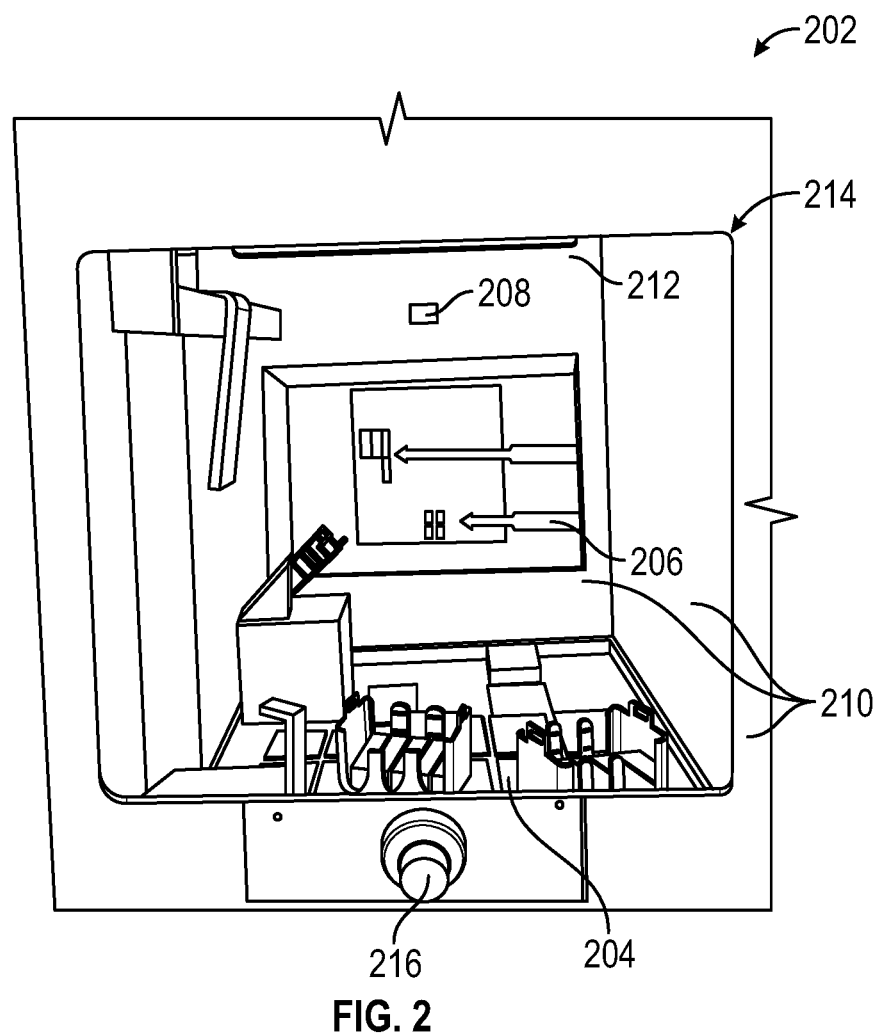
FIG. 2 is a front view of a deck housing of the present disclosure, according to one or more embodiments.

FIG. 2 shows one embodiment of a deck housing 202 having a deck 204, display device 206, and imaging device 208. The housing 202 may have any suitable shape and size configured to accommodate the deck 204 and configured for performing biological analyses or processes therein. In at least one embodiment, the housing 202 may have cube shape with four sides or walls 210, each of which may be enclosed or partially enclosed. Each of the four sides or walls 210 may extend between the deck 204 and an upper portion 212 of the housing 202. In some embodiments, at least one wall 210 may have a window or door 214 configured to allow an operator to access the deck 204.

The housing 202 may have an imaging device 208 arranged on an interior surface thereof. For example and as shown in FIG. 2, the imaging device 208 may be arranged on an inner surface of the upper portion 212. The housing 202 may additionally have a display device 206 arranged therein. The display device 206 may be arranged on an interior surface of a wall 210. As shown for example in FIG. 2, the display device 206 may be arranged on a rear wall 210, on an opposing side of housing from the window or door 214. In this way, the display 206 may be viewed by an operator looking through the window or door 214. This may be particularly beneficial where the display device 206 displays deck setup instructions by providing deck setup instructions in a readily viewable location while the operator configures components on the deck 204. The operator may easily view instructions on the display device 206 at the rear wall of the housing 202 while the operator arranges components on the deck 204. This may provide a marked improvement over conventional systems or housings where a display may be arranged outside the housing. With the display device 206 arranged within the housing 202, the operator may be able to arrange or load components without having to repeatedly turn between the housing and instructions at a different location outside the housing. Arrangement of the display device 206 within the housing 202, such as on a rear wall of the housing, may help avoid errors in deck setup.

In some embodiments, the housing 202 may additionally have one or more knobs 216, buttons, dials, trackpads, joysticks, and/or other peripheral elements for interacting with the display 206. In at least one embodiment, the housing 202 may have a turnable or twistable knob 216 arranged on an exterior surface of a sidewall 210. The knob 216 may be arranged, for example, below the window or door 214, such as below the window or door such that an operator may easily access the knob while viewing the display device 206 and while arranging components on the deck 204. In this way, an operator may easily navigate through instructions or other data on the display 206 without turning attention away from the deck 204.

Returning to FIG. 1, the database 110 may be a remote or local storage device. The database 110 may store programmed protocols, each associated with a particular deck setup configuration. Additionally or alternatively, the database 110 may store deck setup instructions for the operator corresponding to such particular deck setup configurations. For example, the database 110 may store one or more instructions for each of a plurality of different programmed protocols. Each programmed protocol may correspond to one or more biological methods or processes that may be run on the deck 104. An operator may access the database 110 to select among the stored protocols for a particular method or process the operator wishes to run. In some embodiments, the operator may interact with the database via the display device 106. In other embodiments, the database 110 may be accessible via another local or remote user interface or user device, such as but not limited to, a desktop computer, notebook computer, tablet computer, smartphone, or other suitable device.

The data processor 112 may be a local or remote processor configured for executing one or more programs or applications. In some embodiments, the data processor 112 may operate in accordance with computer executable instructions stored at the database 110. In some embodiments, the processor 112 may include, or may be configured to execute instructions for, an instructions module, an imaging module, a verification module, and a feedback module. In other embodiments, the processor 112 may have, or may be configured to execute instructions for, additional or alternative modules.

The instructions module may include hardware and/or software for providing deck setup instructions in accordance with a stored programmed protocol. In particular, the instructions module may be configured for selecting one or more programmed protocols corresponding to a particular method or process to be run on the deck 104. The particular method or process may be one selected or indicated by the operator. In some embodiments, the instructions module may be configured for generating the programmed protocol. For example, where an operator selects a particular process to be run on the deck, such as an NGS library construction using a commercial reagent kit, the instructions module may determine a setup configuration for the deck based on the selected process, number of samples, and/or other factors regarding the process, kit, or deck. Additionally, the instructions module may generate or select one or more operator instructions for instructing an operator how to load the deck in accordance with the programmed protocol. Instructions may include individual steps, a checklist, a workflow list, a component list, a deck setup map or layout, and/or other suitable means for instructing the operator how to configure the deck 104 for the particular process to be run on the deck. Instructions may identify samples, sample quantities, sample containers, vials, vial containers, reagents, reagent quantities, reaction containers, or other labware. Instructions may include details related to how or where to identify samples, reagents, or equipment within the lab, how to position or configure samples, reagents, or equipment, and/or other details. In at least one embodiment, instructions may include, for example, one or more of the following:

1. A list of boxes or other containers that contain reagent vials needed, including box storage conditions. This may aid the operator in knowing where to locate reagent boxes.
2. A list of reagent vials needed within each box. This may aid the operator in knowing which reagent vials to retrieve from the boxes containing reagent vials.
3. A list of bulk reagents needed.
4. A volume of each reagent needed. This may help the operator in selecting an appropriate number of reagent kits or bulk solution containers, for example.
5. Handling conditions and/or instructions for each reagent, such as thaw at room temperature, thaw on ice, resuspend, centrifuge briefly, etc.
6. A carousel location for each kit reagent.
7. A bulk reservoir plating aid which may instruct an operator on the bulk reagents and volumes of such reagents to pipette into a bulk reservoir labware.
8. A sample plating aid, which may identify particular samples to be placed in particular wells on a reaction vessel. Sample volumes may be included as well.

The instructions module may additionally be configured for displaying the instructions. Instructions may be displayed via the display device 106 as one or more screens, and in some embodiments may be displayed as an interactive screen(s). As one example, a deck setup map may be provided, and the operator may have an ability to interact with the map by highlighting and selecting components on the map. Additionally or alternatively, instructions may be displayed by other means, such as on a tablet, smartphone, or other user device, as a printed set of instructions, and/or other display means.

The imaging module may include hardware and/or software for operating the imaging device 108 to obtain one or more images of the deck 104. The imaging module may operate to obtain still and/or video imaging of the deck continuously, intermittently, at intervals, or on demand. In some embodiments, the imaging module may be configured for obtaining one or more images of the deck in response to receiving an indication that an operator has placed a component on the deck, completed an instructed step, and/or completed setting up the deck or a portion of the deck. The imaging module may store images in the database 110.

The verification module may include hardware and/or software for analyzing one or more images of the deck (such as images obtained by the imaging module via the imaging device 108) to determine whether the deck is correctly configured in accordance with a programmed or stored deck setup configuration. In particular, the verification module may be configured to use machine learning, which may include an artificial neural network, to analyze an image of samples, reagents, vials, and/or other labware arranged on the deck to identify the components and determine whether the components are arranged correctly in accordance with a particular deck setup configuration. Based on the imaging, the verification module may be configured to recognize or identify components arranged on the deck, to determine a position of the components, to determine a quantity of the components, and/or to determine an orientation or configuration of the components, and to compare such identification, position, quantity, orientation, and/or configuration to a programmed or stored deck setup configuration. The verification module may analyze deck images for verification using an artificial neural network, template matching, image comparison, and/or other suitable mechanisms. The verification module may examine an image on a pixel-by-pixel basis in some embodiments.

For example, the verification module may be or include an artificial neural network, which may include coded instructions configured for identifying various components arranged on the deck based on shape, size, and/or other visual characteristics of the components. In at least one embodiment, an artificial neural network may be provided or constructed using a plurality of stored example images or baseline images. Based on the example images or baseline images, the verification module may learn to identify particular components or types of components in an image.

Machine learning, such as an artificial neural network, may operate to identify or classify labware components on the deck. Machine learning may be used to train, program, or otherwise configure a processor to recognize or classify components based on shape, color, size, identifying marks, labels, and/or other characteristics of appearance. The processor may further be configured to evaluate a location, orientation, position, and/or quantity of an identified component to determine if it is arranged on the deck in accordance with a particular programmed deck setup configuration. The components on the deck may be identified and/or evaluated consecutively or concurrently in some embodiments. In some embodiments, deck locations or positions may be evaluated individually to determine whether each location has arranged thereon a particular labware component required by the applicable deck setup configuration.

Additionally or alternatively, the verification module may use template matching to identify or classify components on a deck. For example, the verification module may be configured to identify one or more templates in an image. A template may be or include, for example, a pipette tip or an opening configured to receive a pipette tip. The verification module may be configured to identify and count a number of templates within an image.

Additionally or alternatively, the verification module may use image comparison to identify or classify components on a deck. For example, the verification module may be programmed or otherwise configured for comparing an image of the deck to one or more stored images to determine whether one or more areas or components of the deck image match one or more areas or components of the stored image(s).

In some embodiments, the verification module may be trained, programmed, or otherwise configured for identifying colors within an image. In particular, where some lab equipment may have color-coded labels or other colored marks arranged thereon, the verification module may be configured to recognize the particular color to identify whether the component is positioned in a correct location on the deck. As an example, where a deck should be set up with a reaction vessel having a blue lid, the verification module may perform a color recognition on the reaction vessel to determine whether the correct reaction vessel is positioned on the deck. The verification module may be configured to identify or determine other physical characteristics of components, such as size and shape, for example.

In some embodiments, the verification module may be trained, programmed, or otherwise configured for determining a number of components at a location. For example, the verification module may use template matching to count a number of components found in a particular location of the deck. In some embodiments, the verification module may analyze size or height of a stack of components to determine how many components are arranged in the stack.

In some embodiments, the verification module may be configured to recognize or identify other components in an image. For example, the verification module may be configured to read barcodes, quick response (QR) codes, or other codes, labels, or identifiers in an image. A barcode reading library, such as ZBar for example, may be used to scan images for barcodes or other identifiers. In still other embodiments, the verification module may be configured for performing additional analyses with respect to an image of the deck to verify correct deck setup.

The feedback module may include hardware and/or software for conveying to an operator whether the deck, or a portion thereof, is set up correctly in accordance with a particular deck setup configuration. Feedback may be provided in the form of a visual and/or audio response. In some embodiments, feedback may be provided via the display device 106. For example, feedback may be provided as one or more indicators imposed over an image or map of the deck. As a particular example, feedback may include a checkmark positioned over each component on the map that has been verified as correctly placed on the deck and an "x" over each component on the map that could not be, or has not yet been, verified. As another example, feedback may include an alert message that appears on the display in response to one or more incorrectly placed components on the deck. In other embodiments, feedback may include other visual displays, sounds, or other suitable feedback means configured to provide an indication of verified and/or unverified deck setup components.

It is to be appreciated that the system 100 may be embodied in a single device in some embodiments. For example, the database 110 and data processor 112 may be embodied within or incorporated into the deck housing 102, together with the deck 104, display device 106, and imaging device 108 in some embodiments. In at least one embodiment, the system 100 may be embodied in an automated or partially automated laboratory workstation, such as an automated or partially automated liquid handling system.

In use, a system of the present disclosure may operate to verify a deck setup of samples, reagents, vials, and/or other labware in real time and may further provide feedback to a technician or other operator to guide the operator in arranging the samples and/or other components on the deck. In particular, as a technician or other operator loads components onto a deck, an imaging device of the present disclosure may capture images of the deck, such that a position and/or identification of the components may be verified from the imaging. Additionally, in some embodiments, the system may provide deck setup verification feedback to the operator in real time via a display.

Figure 3:
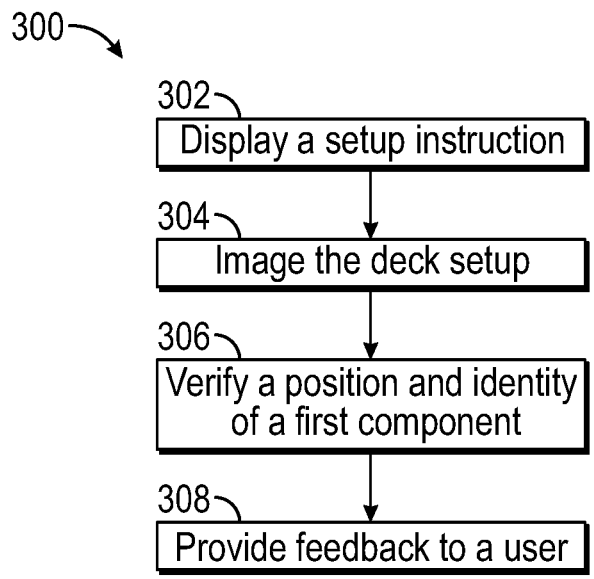
FIG. 3 is a flow diagram of a method for verifying a laboratory deck setup of the present disclosure, according to one or more embodiments.

Turning now to FIG. 3, a method 300 of deck setup verification is shown, according to one or more embodiments. The method 300 may include the steps of displaying a setup instruction 302; imaging the deck setup 304; verifying a position and identity of a first component 306; and providing feedback to an operator 308. In other embodiments, the method 300 may include additional or alternative steps. The method 300, or steps thereof, may be performable by a system of the present disclosure, such as the system 100 described above. For example, the method 300 may be embodied as computer executable instructions stored on non-transitory computer readable media, and a processor of the present disclosure may be configured for executing the instructions.

With continued reference to FIG. 3, displaying a setup instruction 302 may include displaying a written, graphical, or other visual instruction via a monitor, screen, or other display device. The instruction may correspond to a particular stored or programmed protocol or procedure. The instruction may identify one or more labware components to be positioned on the system deck and may be based on a designated type of run or biological analysis to be performed. Additionally, the instruction may designate a location on the deck where the particular component(s) should be placed. In some embodiments, the instruction may be or include a graphical representation or map of components arranged on the deck, such that an operator may arrange components on the deck by replicating the arrangement shown in the graphical representation. In other embodiments, the instruction may include a list or checklist. In at least one embodiment, the instruction may include one or more of the instructions identified above.

Instructions may be provided before and/or while an operator sets up the deck. For example, in some embodiments, one or more instructions may be displayed on a display device within the deck housing, such that the operator may easily view the instruction(s) while arranging components on the deck. In some embodiments, instructions may be displayed as multiple screens, steps, or pages.

In some embodiments, a displayed instruction may be interactive. For example, where the instructions are provided on a monitor or screen, the operator may have an ability to navigate through the instructions using a knob, button, switch, mouse, keyboard, joystick, and/or other suitable navigation device. In at least one embodiment, a twistable or turnable knob may allow an operator to turn the knob to highlight elements displayed on the screen and/or to press the knob to select a highlighted item. As an example, an instruction may include a checklist, and an operator may use the knob or another navigation device to select an item on the checklist and check the item as being completed. As another example, an instruction may include a graphical representation of a deck setup, and an operator may use the knob or another navigation device to select a component on the graphical representation and indicate that the item has been placed on the deck in accordance with the layout.

It is to be appreciated that while instructions may be provided by a screen or monitor, instructions may additionally or alternatively be provided in other forms. In some embodiments, an instruction may be provided on paper or via an audio message, for example. In other embodiments, instructions may be provided by other means to guide an operator in arranging components on the deck in accordance with a particular deck setup configuration for a process or run to be completed on the deck.

Figure 4:
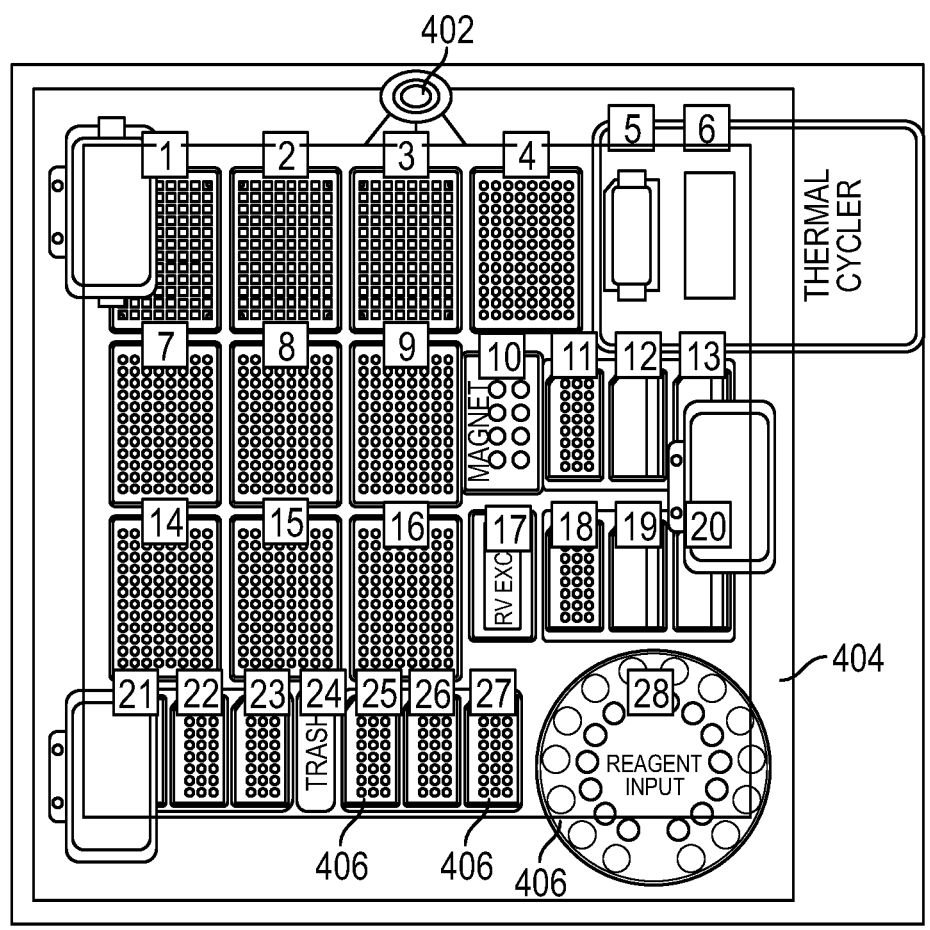
FIG. 4 is a top view of a deck and imaging device of the present disclosure, according to one or more embodiments.

With continued reference to FIG. 3, the method 300 may additionally include imaging the deck setup 304. Imaging the deck setup may include, using a camera, capturing one or more images of the deck. Imaging may include one or more still photos and/or video of the deck. Images of the deck may be taken from a position above the deck so as to show a plan view of the deck, or a portion thereof. The plan view images may show components that may be arranged on the deck, such as samples, vials, or other components. FIG. 4 shows a diagram of a camera 402 arranged above a deck 404 and configured to capture overhead or plan view images of components 406 arranged on the deck.

Images may be collected before, during, and/or after an operator places components on the deck to verify correct deck setup in accordance with a particular deck setup configuration. In some embodiments, one or more images may be collected each time an operator places an item on the deck. For example, the operator may indicate, by interacting with the display or by another suitable means, that a first component has been placed on the deck in accordance with instructions. In response to receiving the indication from the operator that the first component has been arranged on the deck, one or more images of the deck may be obtained. This may be repeated each time an operator indicates that a step has been completed or that a next component has been placed on the deck. In other embodiments, other means may be used to determine whether and when an operator has placed a component on the deck or has completed a step in the deck setup. For example, machine learning may be used to identify when a new component has been added to the deck. In other embodiments, the deck may have a weight sensor, or the housing may have a motion sensor in some embodiments. In other embodiments, other suitable means may be used to determine when the operator has completed a step or placed a component on the deck. In still other embodiments, images may be collected continuously, intermittently, at intervals, or on demand. In at least one embodiment, continuous image collection may begin when an operator selects a protocol and may continue until all appropriate components have been verified on the deck.

With reference once again to FIG. 3, the method 300 may include verifying a position and/or identity of a first component 306 arranged on the deck. In some embodiments, a position and/or identity of a component may be verified each time the operator adds a new component to the deck or each time the operator completes an instructional step in the deck setup. In other embodiments, position and/or identity of each of the deck setup items may be verified after the operator has placed all items on the deck or indicated that all steps are complete. In still other embodiments, position and/or identity of items may be verified continuously, intermittently, at intervals, or on demand.

Verifying a position and/or identity of a component on the deck may include evaluating one or more images of the deck to determine whether a component arranged thereon has an identity, location, quantity, orientation, and/or configuration in compliance with a particular deck setup configuration. Components on the deck may be verified using a neural network, template matching, image comparison, barcode reading, color recognition, and/or other suitable image analyses. Images may be analyzed to determine whether correct components are arranged on the deck in correct locations and with correct configurations, orientations, or quantities. In some embodiments, two or more image analyses may be performed to verify a component arranged on the deck. For example, a neural network may be used to determine whether a reaction vessel (RV) is arranged in a particular location on the deck, and whether the RV has a lid and/or seal in accordance with a particular deck setup configuration. Additionally, the image may be analyzed with respect to a barcode library to determine whether a barcode on the RV identifies the RV as a correct RV in accordance with the deck setup configuration. Template matching or image comparison may include the comparison of a template or reference image of a correct component, correctly arranged on the deck, with the real time image of the component that has been loaded onto the deck. In some embodiments, the template or reference image can be used across multiple workstations of the same type. In other embodiments, the template or reference image is created by the same camera, on the same workstation, that captures the real time image, thereby minimizing the effects of such things as camera angle or position, lighting, shadowing, and/or absolute positioning of components on the deck, which may vary slightly from workstation to workstation. In some embodiments, to minimize the effects of lighting and shadowing that may vary between the template or reference image and the real time image, the template or reference image may be a color image that is converted to a gray scale version that is compared with a gray scale version of the real time image. Thus, for example, the templates discussed herein can be generated from raw BGR images and stored. Then, when a real time image is compared to the template (e.g., compare the image of the deck with x-stored template images of a tip or a tip opening), a gray scale version of the input image (black and white) is compared to the gray scale version of the template image before cutting out each individual image (e.g., a tip image). Additional image processing steps can be carried out. For example, for microtip positions, before the comparison a binary threshold value can be used to mask lighter areas caused by the reflection from white inserts from an empty tip slot before making comparison with the template image.

Figure 5:
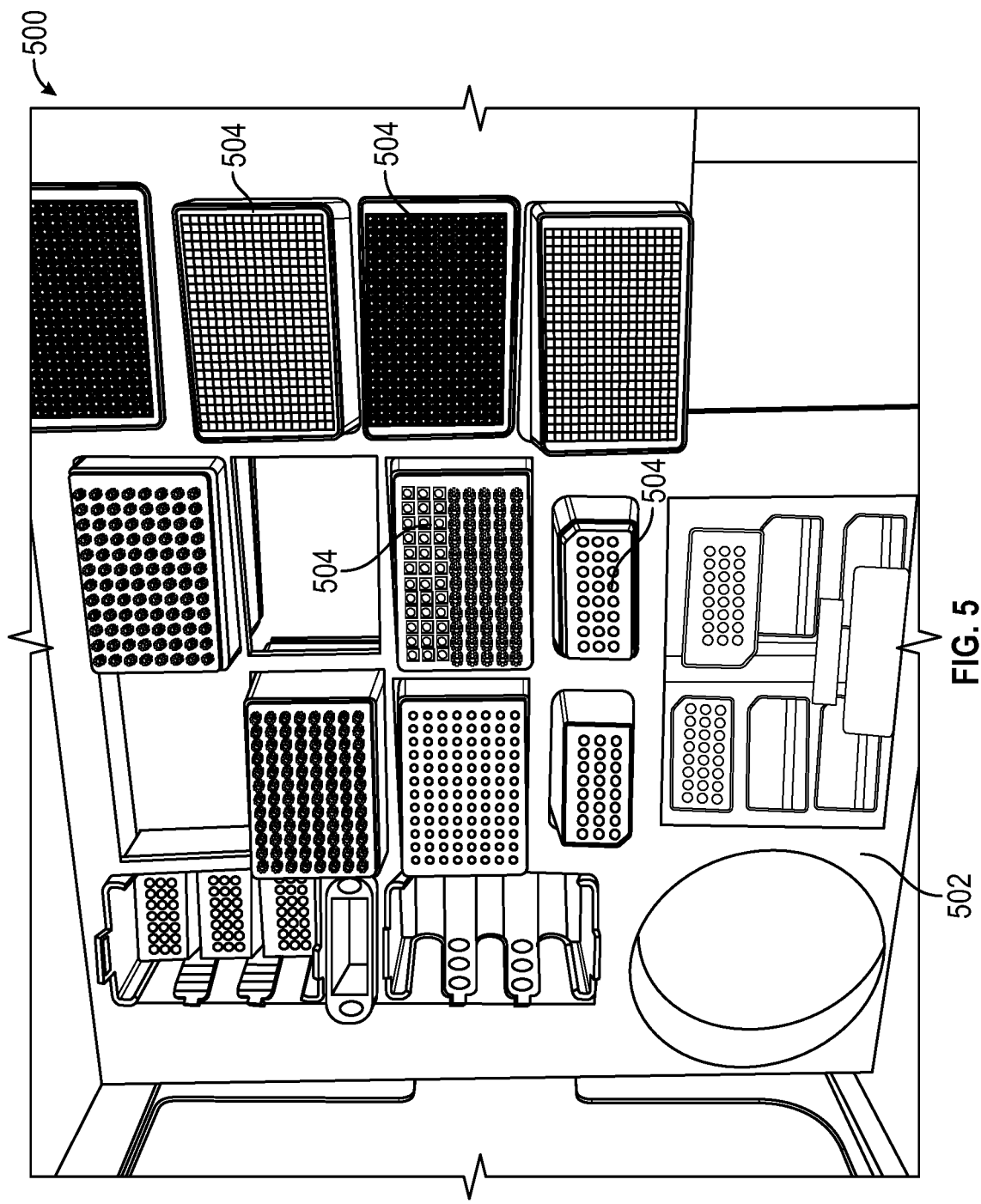
FIG. 5 is an image of a deck, which may be obtained by an imaging device of the present disclosure, according to one or more embodiments.
Figure 6:
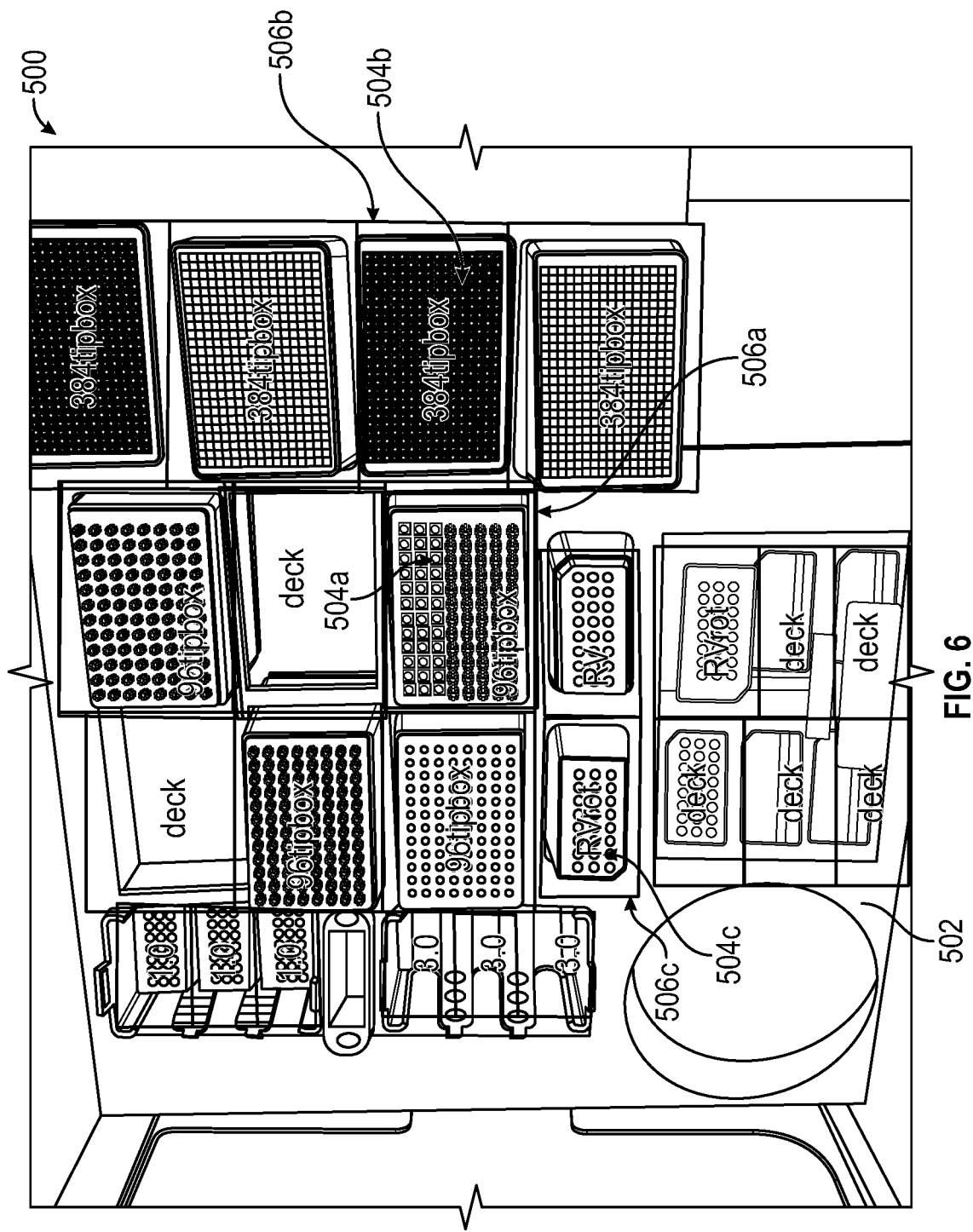
FIG. 6 shows a deck configuration diagram superimposed on the deck image of FIG. 5, according to one or more embodiments.

As a particular example, FIG. 5 shows an overhead image 500 of a deck 502 having labware components 504 arranged thereon. As may be appreciated with respect to FIG. 5, a variety of different types of lab equipment, including for example pipette holders, reaction vessels, and/or other lab equipment or components 504 may be arranged on the deck 502 for performing a particular analysis or process. The image 500 may be analyzed to determine whether components are arranged on the deck 502 as required by a deck setup configuration for performing the analysis or process. FIG. 6 shows the deck image 500 overlaid with component identifications as may be determined using, for example, a neural network, image comparison, and/or template matching.

As a particular non-limiting example of component verification, a deck setup configuration may require that a particular size and/or type of pipette tip container, such as a 96- or 384-pipette tip box, be arranged at a particular location 506a on the deck 502. Machine learning or an artificial neural network may be used to examine the deck image 500 with respect to the location 506a where the pipette tip container is required. Machine learning or an artificial neural network may be trained, programmed, or otherwise configured to determine whether an item 504a positioned in the particular location 506a is, e.g., a 96- or a 384-pipette tip box. In particular, machine learning or an artificial neural network may determine whether the item 504a is: (1) a 96-pipette tip box; (2) a 384-pipette tip box or (3) a different item. If the item 504a is determined to be a 96-pipette tip box, it may be determined that the location 506a is satisfied. If the item 504a is determined to be a different item, an error may be recorded to alert the operator that the item is incorrect.

Additionally, in some embodiments, the machine learning or artificial neural network may determine whether the item 504a is configured or arranged correctly where a particular configuration or arrangement of the component is required. For example, it may be determined whether the item 504a is: (1) a 96-pipette tip box without a lid; (2) a 96-pipette tip box with a lid; (3) a 384-pipette tip box without a lid; (4) a 384-pipette tip box with a lid; or (5) a different item. If it is determined that the item 504a is the correct box but contains a lid or other covering, an error may be recorded to alert an operator to remove the lid for processing.

Figure 7:
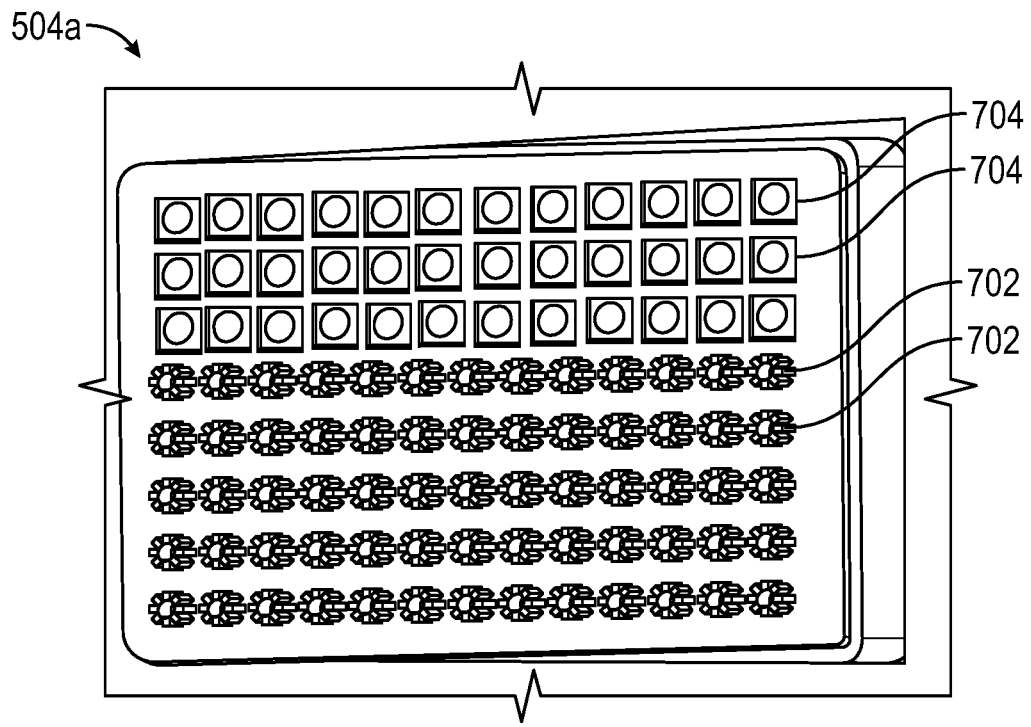
FIG. 7 is a portion of the deck image of FIG. 5 showing a close-up view of a pipette tip box, according to one or more embodiments.

Additionally, if the deck setup configuration requires that the box contain a particular number and/or configuration of tips or of openings without tips, template matching, for example, may be used to identify and count a number of tips or openings in the image of the box. FIG. 7 shows a close-up view of the item 504a arranged on the deck 502 and having a number of tips 702 and openings 704 without tips. Template matching may be used to compare the image of the deck with one or more stored template images of a tip or a tip opening. Thus, for example, template matching can be used to compare the image of the deck with x-stored template images of a tip or a tip opening, wherein "x" corresponds to the number of tips or tip openings. Using x-stored template images can be helpful in situations where, e.g. deck lighting casts a different shadow on the tips in the same tipbox; and/or the perspective distortion of the camera results in different view of the tips in the same tipbox. Thus, template matching may be employed to identify each opening 704 of the item 504a and to count a total number of openings to determine whether the box contains a correct number and/or pattern of openings (and thus by extension, a correct number and/or pattern of tips). In other embodiments, the tips 702 may be identified and counted instead of, or in addition to, the openings. Those of skill in the art will recognize that the ability to count the total number of openings can be determined, at least in part, by angles of the camera mounting. For example, depending on a camera angle, some of the tip openings can be blocked by the adjacent tips. As a result, it may be helpful to use the tips as templates, instead of the openings in a tipbox, when a camera angle is used that causes one or more tips to block the view of one or more adjacent openings.

In some embodiments, deck setup instructions may be dynamically modified in response to component verification. For example, where an operator is instructed to load a particular number of tips onto the deck, and the operator loads fewer than the particular number of tips, a system of the present disclosure may calculate an additional number of tips still needed and instruct the operator to load the additional number of tips. As a particular example, where a particular run or method to be performed requires 96 tips, and the operator loads two boxes each containing 48 tips, the system may verify proper deck setup for that component or location on the deck. However, if the operator loads two partial boxes, each box containing only 20 tips, the system, upon counting the number of tips present, may calculate that 56 tips are still needed. The system may then instruct the operator to load an additional 56 tips.

Figure 8:
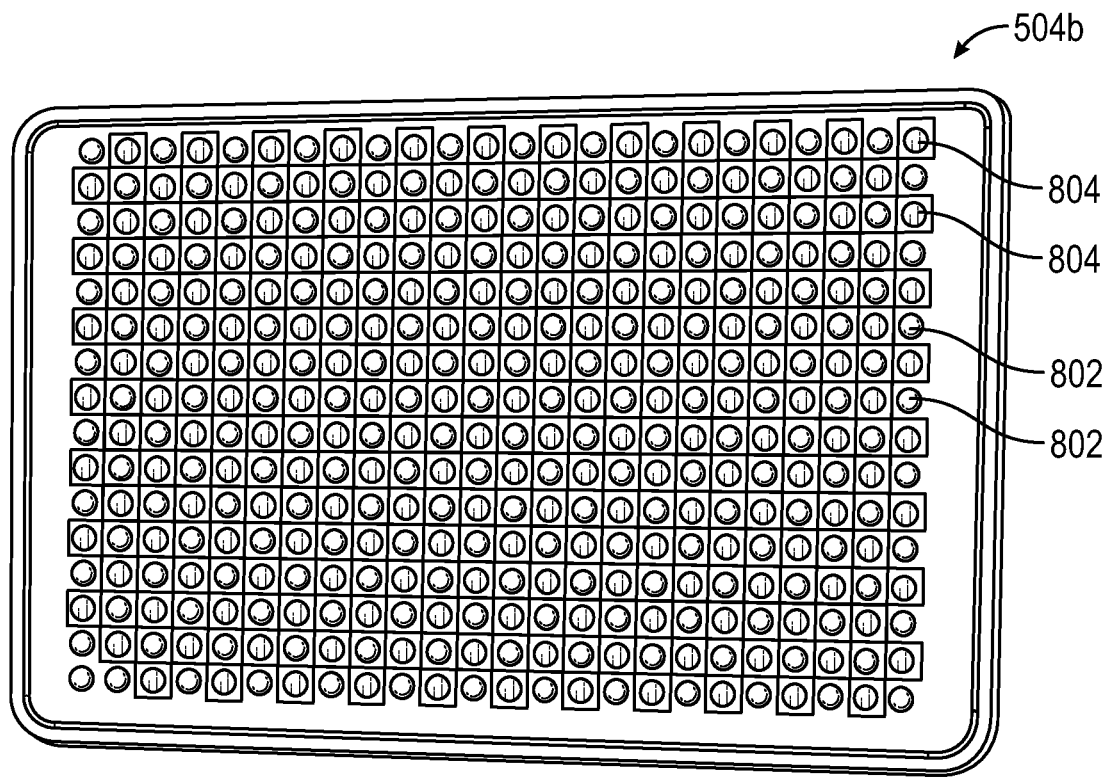
FIG. 8 is a portion of the deck image of FIG. 5 showing a close-up view of another pipette tip box, according to one or more embodiments.

As another particular non-limiting example of component verification, a deck setup configuration may require that a particular size and/or type of pipette tip container, such as a 384-pipette tip box, be arranged at a particular location 506b. Machine learning or an artificial neural network may be used to examine the deck image 500 with respect to the location 506b where the pipette tip container is required. Machine learning or an artificial neural network may be trained, programmed, or otherwise configured to identify whether an item 504b arranged in the location 506b is: (1) a 384-pipette tip box without a lid; (2) a 384-pipette tip box with a lid; or (3) a different item. FIG. 8 shows a close-up view of the item 504b arranged on the deck 502 at location 506b and having a number of tips 804 and openings 802 without tips. Template matching may be used to identify and count each tip 804 in the box 504b to determine whether the box contains a correct number and/or pattern of openings. In other embodiments, each opening 802 may be identified and counted using template matching.

Figure 9:
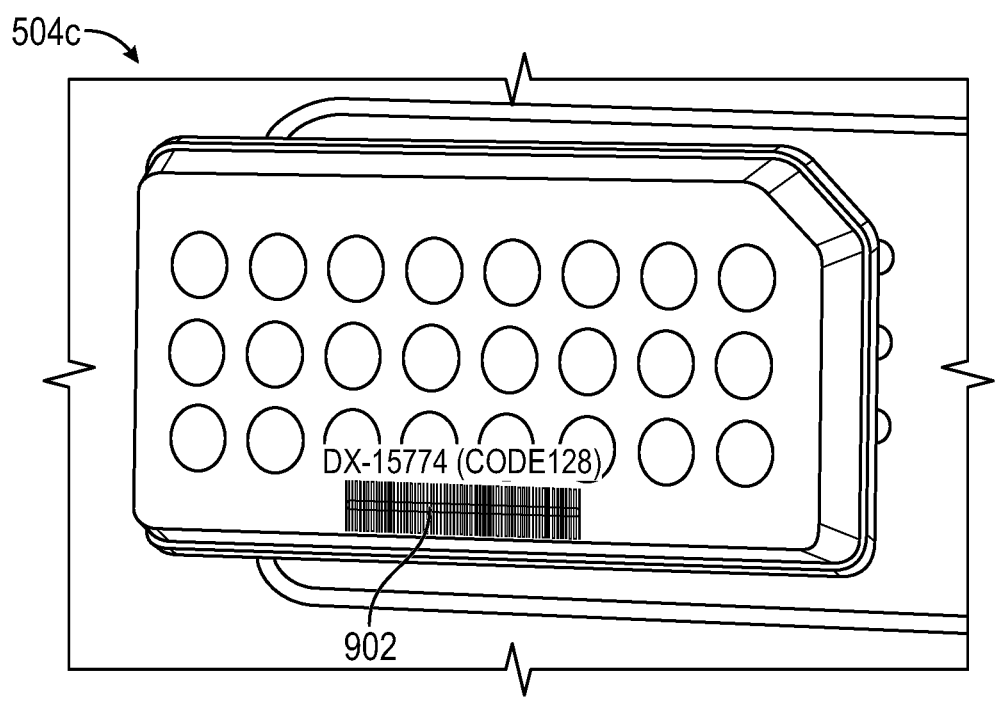
FIG. 9 is a portion of the deck image of FIG. 5 showing a close-up view of a reaction vessel, according to one or more embodiments.

As another non-limiting example of component verification, a deck setup configuration may require that a particular reaction vessel (RV) be arranged at a particular location 506c of the deck 502. Machine learning or an artificial neural network may be used to examine the deck image 500 with respect to the location 506c to determine whether an item 504c arranged in the location is a reaction vessel, whether it has a lid, and/or whether the reaction vessel is at the correct or expected rotation. For example, the image 500 may be examined to determine whether the item 504c in the location 506c is: (1) a RV with a lid in the correct rotation; (2) a RV with a lid in an incorrect rotation; (3) a RV without a lid in the correct rotation; (4) a RV without a lid in an incorrect rotation; or (5) a different item. In some embodiments, where a particular RV is required, the image may be examined to read an identifier for the RV. For example, FIG. 9 shows a close-up view of the item 504c arranged on the deck 502 and having a barcode 902 arranged thereon. From the image 500, the barcode 902 may be read using a barcode reading library and compared to an RV barcode associated with the particular location 506c on the deck to determine whether the correct RV is in place.

Where RVs are stacked or where a deck setup configuration requires a stack of RVs at the location 506c, a neural network may evaluate the image at the position 506c to determine whether the location contains 1, 2, 3, or another suitable number of RVs, for example. As a particular example, where the position 506c should contain 3 RVs without lids according to a deck setup configuration, a neural network may determine whether the location contains (1) 3 RVs, (2) 2 RVs, (3) 1 RV, (4) any number of RVs with a lid, or (5) no RVs.

With reference once again to FIG. 3, the method 300 may additionally include providing feedback to an operator or user 308 regarding whether the deck, or a portion thereof, is set up accurately in accordance with a particular programmed or stored deck setup configuration. As described above, feedback may be provided via the display and/or via other suitable visual and/or audio feedback means. In some embodiments, feedback may be provided after each component is arranged on the deck by an operator. For example, after an operator places a component on the deck, a position and/or identity of the component may be verified at step 306, and feedback may be provided to the operator regarding that component at step 308. In other embodiments, feedback may be provided to an operator for a plurality of components. In some embodiments, feedback may be provided to the operator after all components or substantially all components have been placed on the deck, or after the operator indicates that the deck set up is complete. In some embodiments, feedback may only be provided to the operator if it is determined that a component is incorrectly placed on the deck. That is, in some embodiments, the operator may only be alerted if an error is found. In some embodiments, feedback related to errors in deck setup may be provided for each component (or each error found) sequentially as the errors are found or as the components are placed. Additionally or alternatively, feedback may be provided simultaneously for a plurality of components or a plurality of errors found. In some embodiments, feedback may include only positive component verifications, or feedback may include both positive verifications and errors. It is to be appreciated that, in some embodiments, feedback may be provided in real time, or substantially in real time, as an operator places samples, lab equipment, and/or other items on a deck. This may allow an operator to correct deck set up errors quickly and may avoid compounding errors in the deck setup. In some embodiments, an operator may have an option to ignore or overrule feedback indicating deck setup errors. This may allow the operator to continue with a method or run despite a deck setup error indication. Such an override decision may be stored, such that it may be reviewed with other system data or run data.

It is to be appreciated that, in some embodiments, an operator may be instructed to set up a deck using a particular order of operations, while in other embodiments, the operator may have freedom to set up the deck in any desired order. For example, an operator may be instructed to load components onto the deck beginning at locations furthest or distal from the operator, and progressing through locations increasingly closer or proximal to the user. In this way, systems and methods of the present disclosure may help to improve efficiency in deck setup and/or reduce risk of spills or accidents that may occur when the operator reaches across previously loaded equipment. In some embodiments, verification may be required after each instruction or step before a next instruction or step is displayed to the operator. However, in other embodiments, the operator may have the option to load equipment onto the deck in any desired order. For example, instructions may include a map of the deck displaying the particular components required at each location according to a stored deck setup configuration. The operator may load components in accordance with the map in any desired order, and components may be verified either as they are loaded, in real or substantially real time, or after the operator has loaded all components. As described above, continuous imaging of the deck may allow components to be verified as they are loaded. As each component or deck location is verified, feedback may be provided to the operator. When all required components or deck locations have been verified, imaging may stop in some embodiments.

In addition to, or alternative to, workstation deck setup, system and methods of the present disclosure may guide an operator in removing items from a deck or in deck teardown during or following a run or analysis performed at the workstation. For example, a system of the present disclosure may operate to instruct a technician or operator in removing components from a deck after a run or analysis, and may further verify that samples, tips, waste, and/or other labware or components have been removed from a deck in real time. In particular, as a technician or other operator removes components from a deck, an imaging device of the present disclosure may capture images of the deck, such that removal of the components may be verified from the imaging. Additionally, in some embodiments, the system may provide feedback to the operator in real time via a display and/or may provide instructions to guide the operator in removing components from the deck in a particular order or manner.

Figure 11:
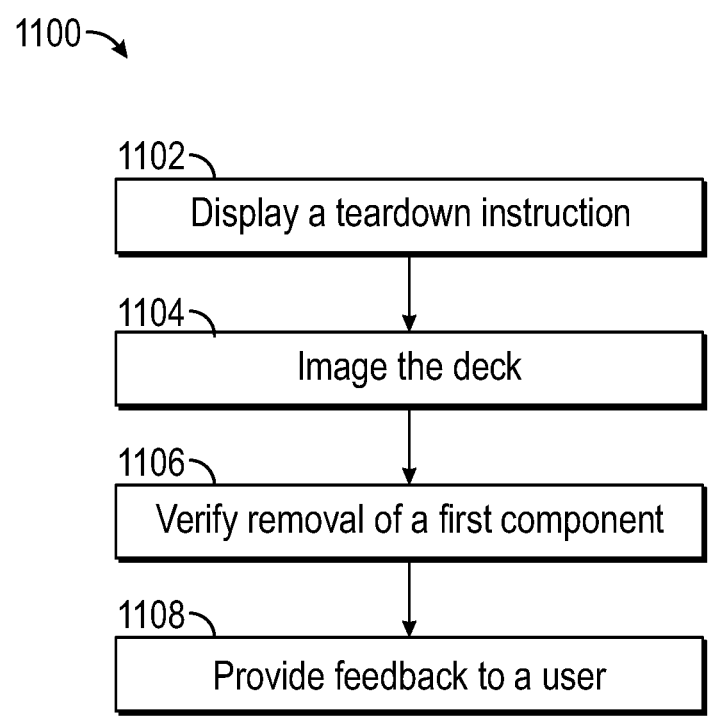
FIG. 11 is a flow diagram of a method for verifying a laboratory deck teardown of the present disclosure, according to one or more embodiments.

Turning now to FIG. 11, a method 1100 of deck teardown verification is shown, according to one or more embodiments. The method 1100 may include the steps of displaying a teardown instruction 1102; imaging the deck 1104; verifying removal of a first component 1106; and providing feedback to a user 1108. In other embodiments, the method 1100 may include additional or alternative steps. The method 1100, or steps thereof, may be performable by a system of the present disclosure, such as the system 100 described above. For example, the method 1100 may be embodied a computer executable instructions stored on non-transitory computer readable media, and a processor of the present disclosure may be configured for executing the instructions.

With continued reference to FIG. 11, displaying a teardown instruction 1102 may include displaying a written, graphical, or other visual instruction via a monitor, screen, or other display device. The instruction may correspond to a particular stored or programmed protocol or procedure. In some embodiments, the instruction may identify a particular component, group of components, or category of components for removal from the deck. In other embodiments, the instruction may identify a particular location or area of the deck from which to remove components. In some embodiments, the instruction may be or include a graphical representation or map of the deck. Additionally or alternatively, the instruction may include a list or checklist.

Instructions may be provided before and/or while an operator tears down, clears, or generally removes items from, a deck. For example, and as described above with respect to deck setup, one or more instructions may be displayed on a display device within the deck housing, such that the operator may easily view the instruction(s) while removing components from the deck. As further described above with respect to deck setup, instructions may be interactive in some embodiments, allowing an operator to navigate through the instructions using a knob, button, switch, mouse, keyboard, joystick, and/or other suitable navigation device.

It is to be appreciated that the instructions may help to guide an operator to tear down or clear a deck in accordance with a particular workflow to help ensure removal of waste and avoid contamination of clean equipment. For example, teardown instructions may direct an operator to unload or remove reusable items (e.g., sample reaction vessels and clean tips) prior to removing waste or disposable items from the deck. As another example, teardown instructions may direct an operator to unload or remove unused stock solutions of, for example, unstable or temperature-sensitive reagents after they have been otherwise employed in a run. Such instructions may be provided during a run, such as during a pause in the run. Additionally, in some embodiments, teardown instructions may direct an operator to remove items generally from locations nearest or proximal to the operator, and moving through locations furthest or distal from the operator, such that the operator may generally avoid reaching over lab equipment.

With continued reference to FIG. 11, imaging the deck 1104 may include, using a camera, capturing one or more images of the deck. Imaging may include one or more still photos and/or video of the deck. A camera or other device used for capturing the one or more images may be similar to those described with respect to deck setup. In some embodiments, a same imaging device may be used for capturing images during deck setup and during deck teardown. In some embodiments, images may be collected continuously during deck teardown. For example, images or a video feed may be collected continuously until removal of all components from the deck is verified. In other embodiments, images or video of the deck may be collected at intervals, intermittently, or on demand. For example, one or more image may be collected each time an operator indicates that a step in the deck teardown has been completed.

Verifying removal of a first component from the deck 1106 may include evaluating one or more images of the deck to determine whether one or more components has been removed or clear, or to determine whether a particular location or region of the deck is empty. As with deck setup, deck teardown may be verified using a neural network, template matching, image comparison, and/or other suitable image analyses. In some embodiments, removal of each component, or clearance of each location or region of the deck, may be verified individually. As a particular example, an operator may be instructed to removal all pipette tips from the deck. A stored deck setup configuration may identify one or more locations or regions on the deck where pipette tips were arranged for the particular run. During teardown, images of the deck may be analyzed to evaluate each of the pipette tip locations on the deck to verify whether each location has been cleared. The image analysis may determine, for example, whether each location on the deck having had pipette tips arranged thereon for a run (1) is empty; (2) has a pipette tip box arranged thereon; or (3) has a different component arranged thereon.

Providing feedback to an operator or user 1108 may include relaying to an operator, via the display device and/or via other suitable visual and/or audio feedback means, whether a particular component or group of components has been removed from the deck or whether a particular location or group of locations on the deck have been cleared or emptied. As with deck setup, feedback may be provided after each component is removed or after each region is cleared. In other embodiments, feedback may be provided after a group of components are removed, after multiple regions are cleared, after one or more steps or instructions have been completed, or after all steps have been completed. In some embodiments, feedback may be provided continuously during deck teardown such that an operator may see in real time, via the display for example, which areas or components still need to be cleared or which steps still need to be performed.

FIGS. 12A-12D illustrate an example of teardown instructions that may be displayed on a graphical user interface, according to at least one embodiment. As shown in FIGS. 12A-12D, the instructions may include a map or diagram 1210 of the deck, which may display a plurality of individual locations or regions. The instructions may additionally include written instructions or directions, which may be displayed as a list, checklist, or outline, for example. As each written instruction is displayed on the interface, the map or diagram 1210 may by configured to dynamically convey instructions, for example by highlighting one or more locations to be cleared, in accordance with a particular written instruction. Additionally, the map or diagram 1210 may dynamically provide feedback to an operator by indicating when a particular location or area is clear, or when a particular component has been removed from the deck.

Figure 12A:
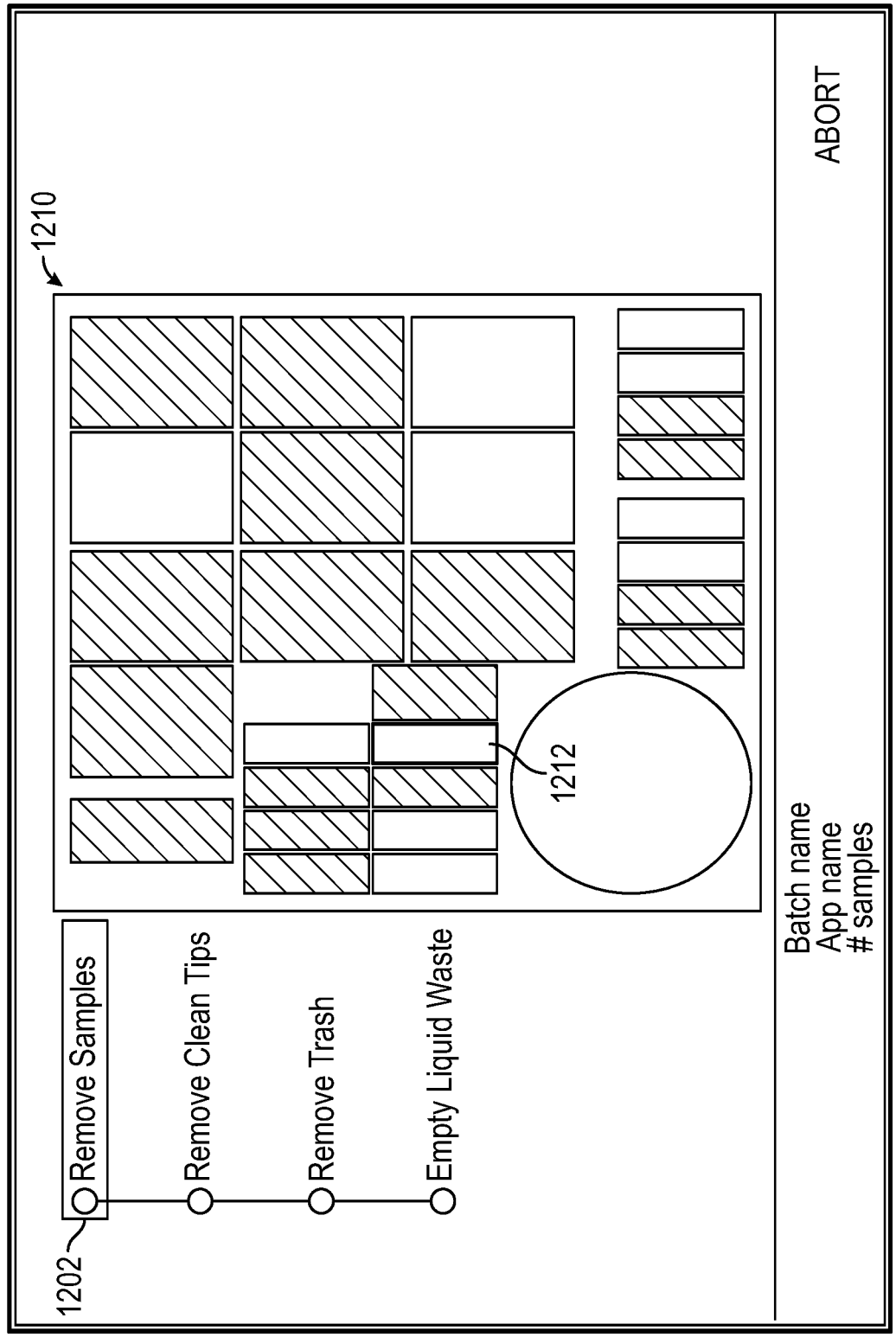
FIG. 12A shows a deck teardown instruction of the present disclosure, according to one or more embodiments.

As shown in FIG. 12A, a first teardown instruction 1202 may be displayed or highlighted. In at least one embodiment, the first teardown instruction 1202 may instruct an operator to remove sample reaction vessels from the deck. Additionally, the deck map 1210 may highlight one or more locations 1212 corresponding to deck locations from which the sample reaction vessels are to be removed, as determined based on a stored deck setup configuration. This may help the operator to quickly find the sample reaction vessels on the deck and clear them as instructed. Once the system has verified, via image analysis, that the reaction vessels have been cleared or removed from the deck, the system may proceed to display a next instruction or step. In some embodiments, the system may proceed to the next step or instruction automatically upon verifying completion of the first step.

Figure 12B:
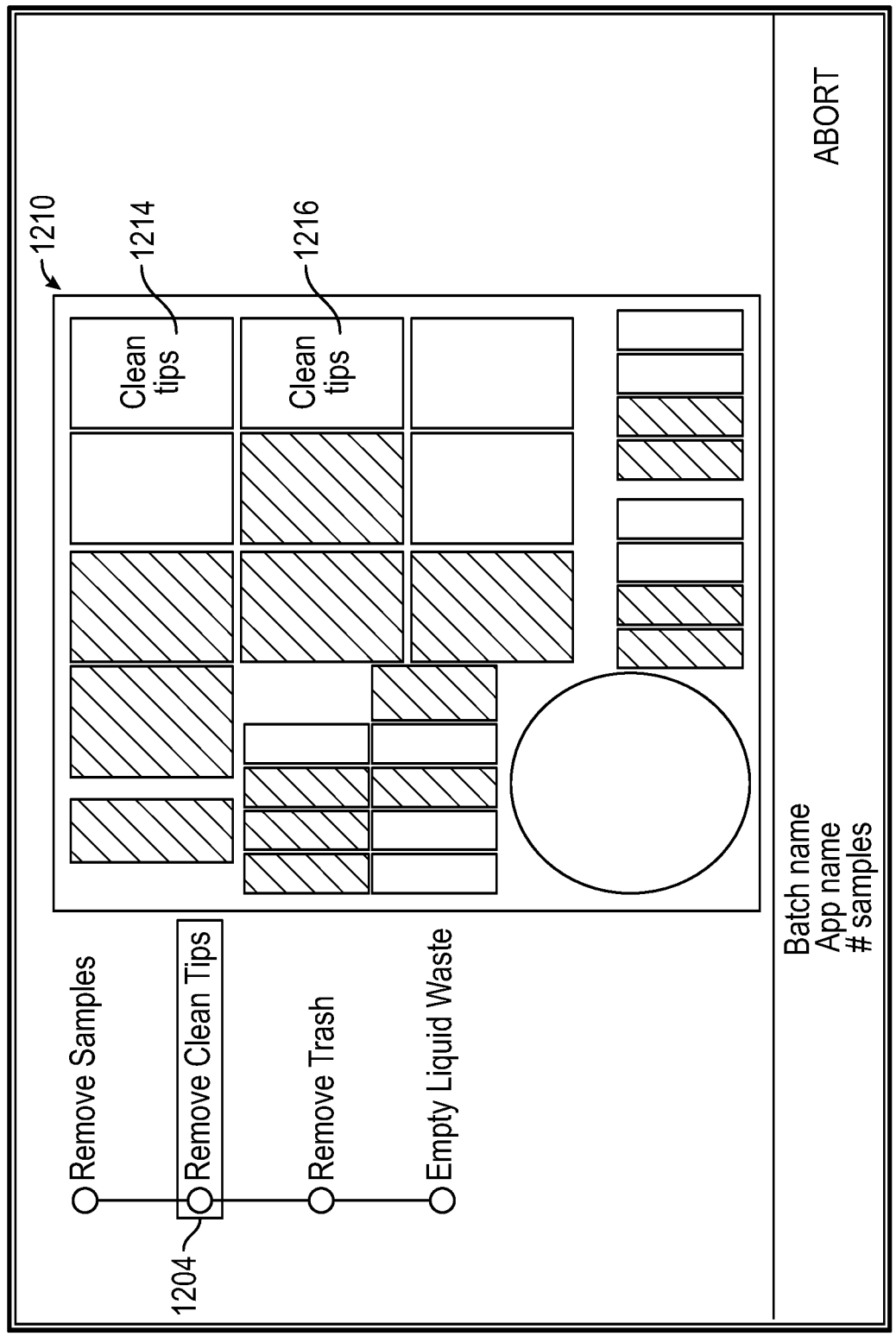
FIG. 12B shows another deck teardown instruction of the present disclosure, according to one or more embodiments.

FIG. 12B shows a second teardown instruction 1204, which may be highlighted or displayed on the interface. The second instruction 1204 may instruct an operator to remove clean tips, or boxes containing clean tips, from the deck. As additionally shown in FIG. 12B, the deck map 1210 may highlight one or more locations 1214, 1216 corresponding to deck locations from which the clean tips may be removed. In some embodiments, each location 1214, 1216 may be highlighted in a first color or with a first icon until removal of the tips has been verified, after which the locations may be highlighted in a second color or with a second icon. In this way, an operator may determine quickly which locations still have clean tips that need to be cleared from the deck. Once the system has verified, via image analysis, that all of the clean tips have been removed from the deck, the system may proceed to display a next instruction or step.

Figure 12C:
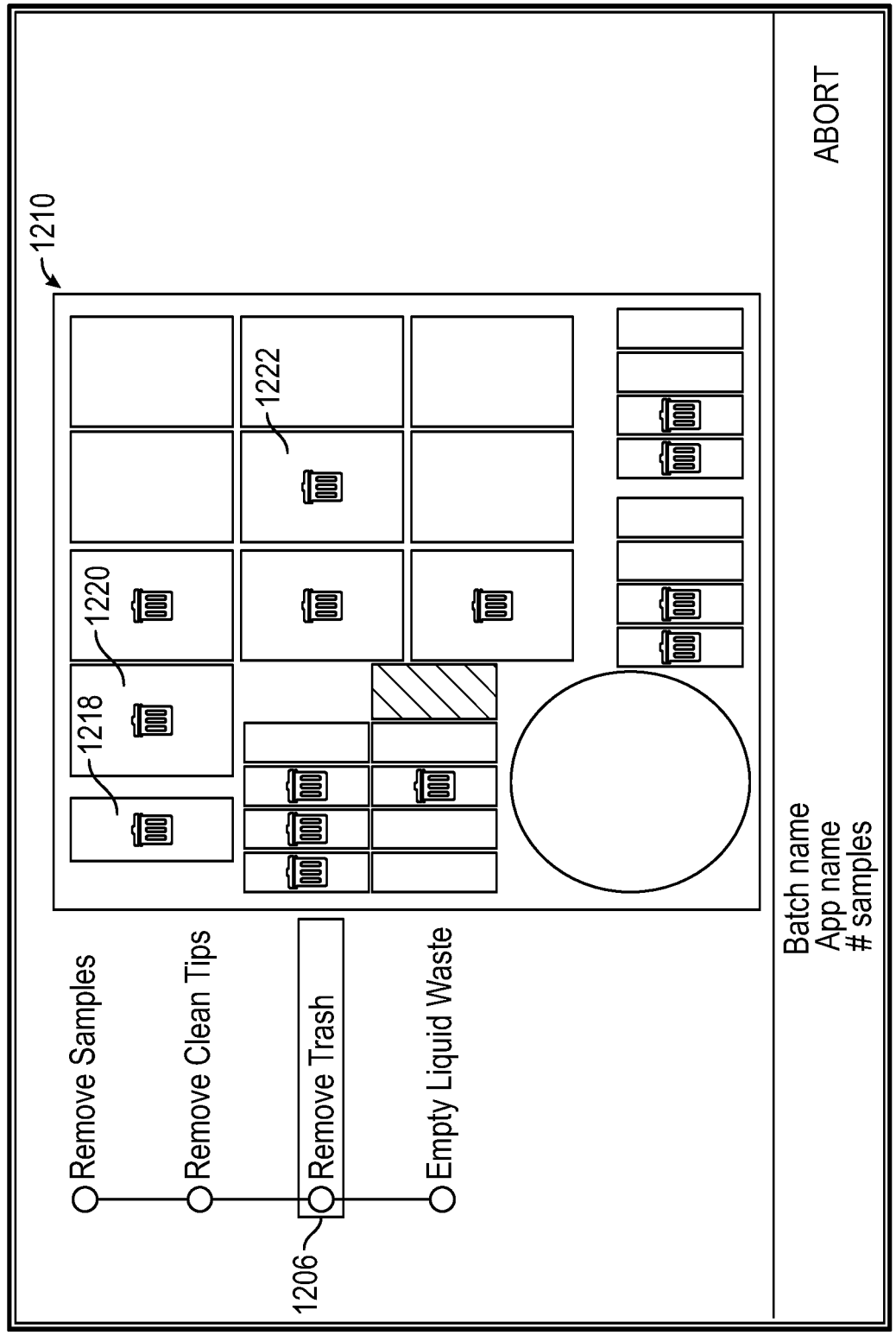
FIG. 12C shows another deck teardown instruction of the present disclosure, according to one or more embodiments.

FIG. 12C shows a third teardown instruction 1206, which may be highlighted or displayed on the interface. The third instruction 1206 may instruct an operator to remove trash or waste from the deck. Trash or waste may include, for example, a thermal cycler seal, empty tip boxes, reaction vessels used for sample processing, reaction vessels used for reagent storage, reservoirs, liquid waste, and/or other equipment or components. In some embodiments, the third instruction 1206 may list or identify individual waste components or categories for removal. As additionally shown in FIG. 12C, the deck map 1210 may highlight one or more locations 1218, 1220, 1222 corresponding to deck locations from which trash may be removed. In some embodiments, locations for trash removal may be highlighted with different colors corresponding to different verification statuses. For example, a first color may indicate that trash still needs to be removed from the location, a second color may indicate that trash removal has been verified, and a third color may indicate an error, incomplete verification, or other status.

Figure 12D:
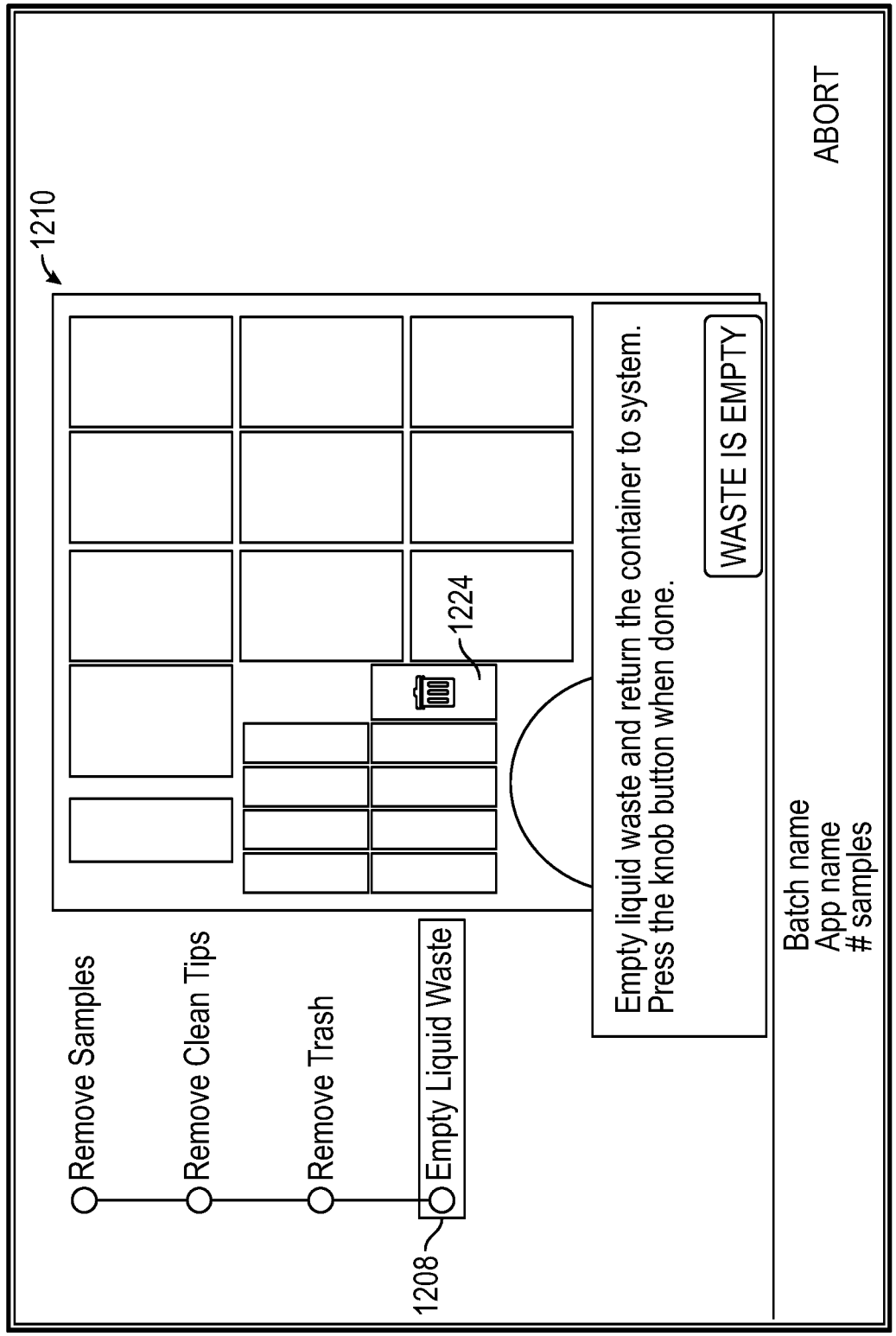
FIG. 12D shows another deck teardown instruction of the present disclosure, according to one or more embodiments.

FIG. 12D shows a fourth teardown instruction 1208, which may be highlighted or displayed on the interface. The fourth instruction 1208 may instruct an operator to remove liquid waste from the deck. The deck map 1210 may highlight one or more locations 1224 corresponding to deck locations from which liquid waste may be removed. In some embodiments, removal of liquid waste may be verified by image analysis. For example, one or more images of the deck may be analyzed using a neural network, template matching, or image comparison to determine whether a liquid waste container is empty or contains a quantity of liquid waste. However, in other embodiments, as shown for example in FIG. 12D, the system may request input from the operator. The operator may press a button or may otherwise interact with the interface to indicate that the liquid waste has been cleared. It is to be appreciated that other teardown and/or setup steps may be verified similarly by user interaction.

It is to be appreciated that, while deck teardown is described above with respect to particular instructions, deck teardown may include additional and/or alternative instructions or steps configured to guide an operator through clearing components from the deck. Moreover, it is further to be appreciated that FIGS. 12A-12D provide a non-limiting example of instructions and feedback that may be displayed to an operator during deck teardown.

While, in some embodiments, teardown instructions may be provided to guide an operator through a particular sequence or workflow, as described above with respect to FIGS. 12A-12D, in other embodiments, the operator may be permitted freedom to remove components from the deck in any desired order. For example, instructions may include a map of the deck displaying the particular components that require removal stored deck setup configuration. The operator may remove components in accordance with the map in any desired order, and removal of components may be verified either as they are removed, in real or substantially real time, or after the operator has removed all components. As described above, continuous imaging of the deck may allow removal of components to be verified as they are removed. As clearance of each component or deck location is verified, feedback may be provided to the operator. When all required components or deck locations have been verified as cleared, imaging may stop in some embodiments.

Figure 10:
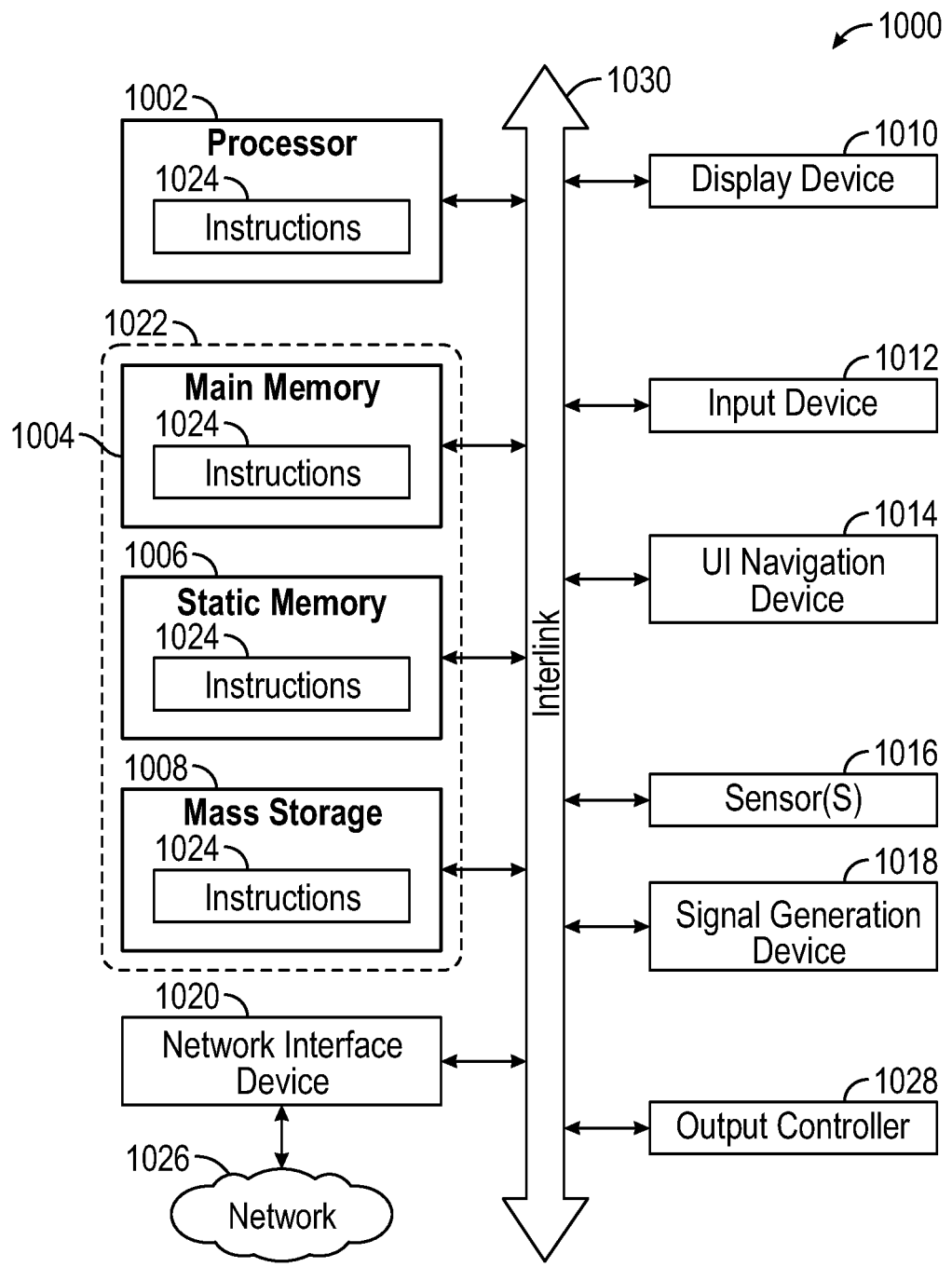
FIG. 10 is a block diagram of another system of the present disclosure, according to one or more embodiments.

FIG. 10 illustrates a block diagram of an example machine 1000 (which may be or be included as part of the system 100, processor 112, or other components described herein) upon which any one or more of the techniques (e.g., methods) discussed herein can perform. Examples, as described herein, can include, or can operate by, logic or a number of components, or mechanisms in the machine 1000.

In some embodiments, the machine 1000 can operate as a standalone device or can be connected (e.g., networked) to other machines. In a networked deployment, the machine 1000 can operate in the capacity of a server machine, a client machine, or both in server-client network environments. In some examples, the machine 1000 can act as a peer machine in peer-to-peer (P2P) (or other distributed) network environment. The machine 4000 can be a personal computer (PC), a tablet PC, a set-top box (STB), a personal digital assistant (PDA), a mobile telephone, a smartphone, a personal fitness tracker, a smartwatch or other wearable device, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 can include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drives, tape drives, flash storage, or other block devices) some or all of which can communicate with each other via an interlink (e.g., bus) 1030. The machine 1000 can further include a display unit 1010, an alphanumeric input device 1012 (e.g., a keyboard), and a user interface (UI) navigation device 1014 (e.g., a knob, dial, button, or mouse). In some examples, the display unit 1010, input device 1012 and UI navigation device 1014 can be a touch screen display. The machine 1000 can additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 can include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 can be, or include, a machine readable medium 1022 on which is stored one or more sets of data structures or instructions 1024 (e.g., software) embodying or utilized by any one or more of the techniques or functions described herein. The instructions 1024 can also reside, completely or at least partially, within any of registers of the processor 1002, the main memory 1004, the static memory 1006, or the mass storage 1008 during execution thereof by the machine 1000. In some examples, one or any combination of the hardware processor 1002, the main memory 1004, the static memory 1006, or the mass storage 1008 can constitute the machine readable media 1022. While the machine readable medium 1022 is illustrated as a single medium, the term "machine readable medium" can include a single medium or multiple media (e.g., a centralized or distributed database, and/or associated caches and servers) configured to store the one or more instructions 1024.

The term "machine readable medium" can include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In some examples, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In some examples, information stored or otherwise provided on the machine readable medium 1022 can be representative of the instructions 1024, such as instructions 1024 themselves or a format from which the instructions 1024 can be derived. This format from which the instructions 1024 can be derived can include source code, encoded instructions (e.g., in compressed or encrypted form), packaged instructions (e.g., split into multiple packages), or the like. The information representative of the instructions 1024 in the machine readable medium 1022 can be processed by processing circuitry into the instructions to implement any of the operations discussed herein. For example, deriving the instructions 1024 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1024.

In some examples, the derivation of the instructions 1024 can include assembly, compilation, or interpretation of the information (e.g., by the processing circuitry) to create the instructions 1024 from some intermediate or preprocessed format provided by the machine readable medium 1022. The information, when provided in multiple parts, can be combined, unpacked, and modified to create the instructions 4024. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1024 can be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In some examples, the network interface device 1020 can include one or more physical jacks (e.g., Ethernet, coaxial, or phone jacks) or one or more antennas to connect to the communications network 1026. In some examples, the network interface device 1020 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," or "at least one of [X] or [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," or "at least one of [X], [Y], or [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

Deck setup verification systems and methods of the present disclosure may provide many improvements over conventional systems and methods and may provide for a greater reduction of errors in manual deck setup or library construction. For example, the in-unit display described above may improve deck setup workflow by providing a heads-up display. A display arranged on an inner surface of the deck housing may allow an operator to easily view the display without turning attention away from the deck. Whereas convention systems may provide a display, such displays are often arranged outside the housing. Conventional systems may position a display outside of the operator's field of view while the user views the deck, which may require the operator to repeatedly turn away from the deck. By providing a display within the housing itself and on a surface behind the deck, the operator may readily view both the deck and deck setup instructions within a same field of view. Moreover, by providing the instructions within a field of view of the deck, the operator may have an improved spatial sense of where to place components on the deck. Additionally, by providing deck setup instructions within the housing itself, systems of the present disclosure may be relatively compact, and may require less lab space than some conventional systems.

Systems and methods of the present disclosure may additionally provide for more accurate and/or reliable deck setup verification, which may be based on machine learning. In particular, systems and methods of the present disclosure may verify identity and/or placement of components without relying on a correctly applied label. In this way, systems and methods of the present disclosure may provide an improvement over systems that rely on barcodes to verify placement or placement of each component on the deck. In addition, the machine learning described above may be configured for identifying or classifying components without relying on a particular footprint or shape of the components. In this way, systems and methods of the present disclosure may be more customizable and/or more widely applicable to different laboratory systems and/or processes.

Systems and methods of the present disclosure may additionally help to reduce deck setup errors by providing for real-time or near real-time verification. For example, images of the deck and components arranged thereon may be obtained throughout deck setup, such that any errors in the setup may be found and corrected early. As an example, in some embodiments, one or more images of the deck may be obtained each time the operator places a new component on the deck. Thus, placement of each component may be verified as, or after, it is placed. In some embodiments, deck verification may occur continuously. For example, a video feed of the deck may be monitored for component verification continuously as the operator places items on the deck. Feedback may be provided in real time or near real time as the operator is alerted to any failed verifications or any determined errors during setup. In some embodiments, systems of the present disclosure may operate to recognize that an item has been placed on the deck, determine whether the item has been placed correctly, and provide feedback to an operator within a matter of between approximately 0.01 and approximately 2 seconds. In some embodiments, for each component placed on the deck, a system of the present disclosure may perform such verification and feedback within between approximately 0.05 seconds and approximately 1.5 seconds, or between approximately 0.1 seconds and approximately 1 second, or between approximately 0.1 seconds and approximately 0.8 seconds. In this way, verification may be performed in real time or near real time as the operator loads items onto (or unloads items from) the deck. This may allow for real time or near real time error identification. It is to be appreciated that such real time or near real time verification and feedback may provide for a marked improvement over convention deck setup systems and methods that may only verify deck setup upon placement of all components. Where the deck setup is only verified or checked after all components have been placed, errors may have compounded into additional errors and may require a relatively high degree of time and labor to correct.

It is further to be appreciated that in some embodiments, systems and methods of the present disclosure may operate to verify deck setup, not only prior to a run or method, but during such run or method. For example, a run may be paused to allow an operator to replace a used tip box with a fresh box or to otherwise replace or reconfigure any other item of labware or reagent. The systems and methods of the present disclosure may operate to instruct the operator, image the deck, verify correct identity, placement, quantity, and/or configuration of the item, and provide feedback during the run.

What is claimed is:

1. A laboratory workstation for preparing a sample according to a programmed protocol, the laboratory workstation comprising:
    a display device configured to display an instruction for loading a first item of labware onto a deck of the laboratory workstation at a position on the deck specified by the programmed protocol;
    an imaging device configured to monitor the deck of the laboratory workstation by creating one or more images of the deck; and
    a processor configured to recognize, in the one or more images created by the imaging device, an item of labware loaded onto the deck by an operator;
    wherein the processor is further configured to indicate on the display device whether the recognized item of labware loaded by the operator is arranged on the deck in accordance with the programmed protocol.

2. The laboratory workstation of claim 1, wherein the processor is configured to indicate on the display device whether the recognized item of labware is the first item of labware loaded onto the deck at the position specified by the programmed protocol.

3. The laboratory workstation of claim 1, wherein recognizing an item of labware loaded onto the deck by an operator comprises identifying the item using at least one of an artificial neural network, image comparison, and template matching.

4. The laboratory workstation of claim 1, wherein the programmed protocol calls for a plurality of items of labware to be arranged on the deck, and wherein the processor is configured to recognize each of the plurality of items of labware as it is placed on the deck, regardless of order of placement.

5. The laboratory workstation of claim 1, wherein the recognized item of labware comprises a plurality of components, and wherein recognizing the item of labware comprises counting the plurality of components.

6. The laboratory workstation of claim 5, wherein the plurality of components are arranged in a stacked configuration.

7. The laboratory workstation of claim 1, wherein the imaging device is configured to create one or more images or videos of the deck each time the operator places an item of labware on the deck.

8. The laboratory workstation of claim 1, wherein the imaging device is configured to collect one or more images or videos of the deck continuously, at intervals, intermittently, or on demand.

9. The laboratory workstation of claim 1, further comprising a reflective surface configured to reflect a view toward the imaging device.

10. The laboratory workstation of claim 9, wherein the reflective surface is arranged to reflect a view of a thermal cycler toward the imaging device.

11. The laboratory workstation of claim 1, wherein the display device is further configured to display an instruction for unloading the first item of labware from the deck in accordance with the programmed protocol, and wherein the processor is further configured to:
    recognize, in the one or more images created by the imaging device, removal of the first item of labware from the deck by an operator; and
    indicate on the display device whether the first item was removed from the deck in accordance with the programmed protocol.

12. The laboratory workstation of claim 1, wherein the processor is configured to perform the recognizing and indicating steps within between approximately 0.1 to approximately 0.8 seconds.

13. The laboratory workstation of claim 1, wherein the processor is configured to recognize, in the one or more images of the deck, when an operator has loaded an item of labware onto the deck.

14. The laboratory workstation of claim 1, wherein the processor is further configured to analyze the one or more images of the deck using template matching, wherein template matching comprises counting a number of templates identifiable in the one or more images of the deck, wherein the template comprises at least one of a pipette tip and an opening for receiving a pipette tip.

15. A method of verifying arrangement of labware on a deck of a laboratory workstation in accordance with a programmed protocol, the method comprising:
    displaying on a display device an instruction for loading labware onto the deck;
    monitoring the deck by creating one or more images of the deck using an imaging device;
    from the one or more images of the deck, identifying an item of labware loaded onto the deck by an operator;
    from the one or more images of the deck, determining whether the item of labware is arranged on the deck in accordance with the programmed protocol; and
    providing feedback to the operator regarding arrangement of the item of labware.

16. The method of claim 15, wherein the deck is monitored and feedback is provided continuously, substantially in real time, at intervals, intermittently, or on demand.

17. The method of claim 16, further comprising:
    the operator following instructions from the provided feedback.

18. The method of claim 16, further comprising:
    the operator ignoring the provided feedback.

19. The method of claim 16, further comprising:
    the operator overruling the provided feedback.

20. The method of claim 16, further comprising:
    the operator correcting deck set up errors based on the provided feedback.

* * * * *